United States Patent
Nagai et al.

(10) Patent No.: US 10,419,213 B2
(45) Date of Patent: Sep. 17, 2019

(54) KEY EXCHANGE METHOD, KEY EXCHANGE SYSTEM, KEY DEVICE, TERMINAL DEVICE, AND PROGRAM

(71) Applicant: NIPPON TELEGRAPH AND TELEPHONE CORPORATION, Chiyoda-ku (JP)

(72) Inventors: Akira Nagai, Musashino (JP); Tsunekazu Saito, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 53 days.

(21) Appl. No.: 15/542,538

(22) PCT Filed: Jan. 12, 2016

(86) PCT No.: PCT/JP2016/050695
§ 371 (c)(1),
(2) Date: Jul. 10, 2017

(87) PCT Pub. No.: WO2016/114259
PCT Pub. Date: Jul. 21, 2016

(65) Prior Publication Data
US 2017/0373841 A1 Dec. 28, 2017

(30) Foreign Application Priority Data
Jan. 16, 2015 (JP) ................................. 2015-007033

(51) Int. Cl.
*G09C 1/00* (2006.01)
*H04L 9/06* (2006.01)
(Continued)

(52) U.S. Cl.
CPC .............. *H04L 9/0844* (2013.01); *G09C 1/00* (2013.01); *H04L 9/0643* (2013.01);
(Continued)

(58) Field of Classification Search
None
See application file for complete search history.

(56) References Cited

U.S. PATENT DOCUMENTS 9,166,790 B2 * 10/2015 Nakashima ........... H04L 9/0841
2004/0158715 A1 * 8/2004 Peyravian ............. H04L 9/0844
713/171
(Continued)

FOREIGN PATENT DOCUMENTS

EP 2 525 341 A1 11/2012
EP 2 634 760 A1 9/2013
(Continued)

OTHER PUBLICATIONS

Extended Search Report dated Feb. 13, 2018 in European Patent Application No. 16737330.7.
(Continued)

*Primary Examiner* — Christopher A Revak
(74) *Attorney, Agent, or Firm* — Oblon, McClelland, Maier & Neustadt, L.L.P.

(57) ABSTRACT

A random number generating unit generates random numbers $s_1$, $s_2$, $s'_1$, and $s'_2$. A public keys randomizing unit generates first randomized public keys information obtained by randomizing public keys using the random number $s_1$ and second randomized public keys information obtained by randomizing the public keys using the random number $s_2$. A proxy calculation unit calculates a first commission result by using a secret key and calculates a second commission result by using the secret key. A verification unit calculates a first verification value by using the random number $s_2$, calculates
(Continued)

a second verification value by using the random number $s_1$, and verifies whether or not the first verification value and the second verification value coincide with each other. A common key calculation unit calculates a common key by using the random numbers $s'_1$ and $s'_2$ if the first verification value and the second verification value coincide with each other.

10 Claims, 13 Drawing Sheets

(51) Int. Cl.
*H04L 9/08* (2006.01)
*H04L 9/14* (2006.01)
*H04L 9/30* (2006.01)

(52) U.S. Cl.
CPC .......... *H04L 9/0819* (2013.01); *H04L 9/0841* (2013.01); *H04L 9/0869* (2013.01); *H04L 9/0894* (2013.01); *H04L 9/0897* (2013.01); *H04L 9/14* (2013.01); *H04L 9/3093* (2013.01); *H04L 2209/046* (2013.01); *H04L 2209/76* (2013.01)

(56) References Cited

U.S. PATENT DOCUMENTS

| | | | |
|---|---|---|---|
| 2010/0325435 A1* | 12/2010 | Park | H04L 9/0844 713/171 |
| 2012/0323981 A1 | 12/2012 | Yamamoto et al. | |
| 2013/0318360 A1 | 11/2013 | Yamamoto et al. | |
| 2015/0188704 A1* | 7/2015 | Takenaka | H04L 9/0869 713/171 |
| 2017/0104582 A1 | 4/2017 | Yamamoto et al. | |
| 2017/0104583 A1 | 4/2017 | Yamamoto et al. | |
| 2017/0111165 A1 | 4/2017 | Yamamoto et al. | |
| 2017/0353296 A1 | 12/2017 | Yamamoto et al. | |

FOREIGN PATENT DOCUMENTS

| | | |
|---|---|---|
| JP | 5161177 B2 | 3/2013 |
| JP | 5506704 B2 | 5/2014 |

OTHER PUBLICATIONS

Chapter 12: Key Establishment Protocols, Handbook of Applied Cryptography, Oct. 1996, XP001525012, 54 pages.

Sanjit Chatterjee, et al., "Reusing Static Keys in Key Agreement Protocols", Dec. 13, 2009, Progress in Cryptology—Indocrypt 2009, XP019135255, 18 pages.

Office Action dated Oct. 24, 2018 in European Patent Application No. 16737330.7.

International Search Report dated Mar. 15, 2016 in PCT/JP2016/050695 filed Jan. 12, 2016.

Tatsuaki Okamoto, "Key Exchange: Advent of Modern Cryptography and Its Advance", The Institute of Electronics, Information and Communication Engineers, Fundamentals Review, 2007, vol. 1, No. 4, pp. 70-76 (with partial English translation).

Atsushi Fujioka et al., "Ephemeral Key Leakage Resilient and Efficient ID-AKEs That Can Share Identities, Private and Master Keys", Pairing 2010, Lecture Notes in Computer Science, 2010, vol. 6487, pp. 187-205.

Office Action dated Apr. 16, 2019 in European Patent Application No. 16737330.7, 12 pages.

Blake-Wilson, S. et al. "Authenticated Diffie-Hellman Key Agreement Protocols", SAC'98, LNCS 1556, Berlin, Heidelberg, XP055456171, 1999, pp. 339-361.

\* cited by examiner

KEY EXCHANGE METHOD, KEY EXCHANGE SYSTEM, KEY DEVICE, TERMINAL DEVICE, AND PROGRAM

TECHNICAL FIELD

The present invention relates to an applied technology in the information security field and, in particular, relates to a cloud key management-type key exchange technique.

BACKGROUND ART

In Patent Literature 1, a proxy calculation technique is described. Proxy calculation is commissioning another device to perform some calculations. Well-known proxy calculation is requesting a device having a decoding function to decode cipher text and thereby obtaining plain text. For example, assume that a client holds cipher text C obtained by encrypting plain text m by using a public key y and a key device holds a secret key s for the public key y. The client sends the cipher text C to the key device, and the key device obtains the plain text m by decoding the cipher text C by using the secret key s corresponding to the public key y and returns the plain text m to the client. Proxy calculation can solve the problems such as (1) a shortage of calculation capability and functions to be held by the client, (2) leakage of confidential information necessary for the client to execute a function (for example, in an ordinary configuration that does not use proxy calculation, the client themselves has to manage a secret key and there is a possibility that the secret key leaks from the client), and (3) unauthorized use due to loss or theft of a device owned by the client (for example, the key device can stop the decoding function of the client by invalidating the secret key and thereby prevent unauthorized use).

In Non-patent Literatures 1 and 2, key exchange techniques are described. Key exchange is a system for allowing two clients to exchange (share) a key safely by using a communications channel which was made public. As a specific example of key exchange, there is the Diffie-Hellman-Merkle (DHM) key exchange system. In general, although it is possible to perform key exchange by using encryption and decoding, key management is necessary because a secret key is used in encryption and decoding. On the other hand, in the DHM key exchange system, key management becomes unnecessary because random numbers are used in the DHM key exchange system, which improves safety. Moreover, examples of a system that performs key exchange while authenticating the other party with whom a key is shared include authentication key exchange using a digital signature, Menezes-Qu-Vanstone (MQV) authentication key exchange, Hashed MQV (HMQV) authentication key exchange (about these examples, see Non-patent Literature 1), and FSU authentication key exchange (see Non-patent Literature 2).

In Patent Literature 2, a self-correcting technique is described. Self-correction is a technique that always performs correct calculation by using a calculator or a system that does not always output correct calculation results. More specifically, this is a technique that outputs correct calculation results if a calculator that outputs correct calculation results is used and outputs correct calculation results or the results to the effect that calculation is not possible if a calculator that does not always output correct results is used.

PRIOR ART LITERATURE

Patent Literature

Patent Literature 1: Japanese Registered Patent No. 5161177
Patent Literature 2: Japanese Registered Patent No. 5506704

Non-Patent Literature

Non-patent Literature 1: Tatsuaki Okamoto, "Key Exchange: Advent of Modern Cryptography and Its Advance", The Institute of Electronics, Information and Communication Engineers, Fundamentals Review, vol. 1, no. 4, pp. 70-76, 2007
Non-patent Literature 2: Atsushi Fujioka, Koutarou Suzuki, Berkant Ustaoglu, "Ephemeral Key Leakage Resilient and Efficient ID-AKEs That Can Share Identities, Private and Master Keys", Pairing 2010, Lecture Notes in Computer Science, vol. 6487, pp. 187-205, 2010.

SUMMARY OF THE INVENTION

Problems to be Solved by the Invention

When key exchange is performed by using proxy calculation, the following problems arise.

(1) The problem of leakage of a common key arises. For example, when a client $u_1$ and a client $u_2$ perform key exchange by proxy calculation by using a key device (a proxy calculation device), the key device can obtain a common key which only the clients should know and can decipher the cipher communication between the clients. Specifically, since the client $u_1$ sends a public key of the client $u_2$ to the key device as it is, the key device is capable of knowing that the client $u_1$ and the client $u_2$ are about to perform key exchange. Then, the key device can calculate a common key by using a secret key of the client $u_1$ and the public key of the client $u_2$ which was made public or sent.

(2) The problem of processing correctness of a key device arises. If a key device holding a secret key cannot perform correct processing due to a bug or a breakdown, a client cannot verify whether or not the key device has performed correct processing.

(3) The problem of correctness of a key device arises. If a wrong key device is requested to perform proxy calculation, a client cannot detect that the result is the processing result of the wrong key device.

In view of these points, an object of this invention is to provide a key exchange technique that does not allow a key device to calculate a common key and allows a client to confirm that processing has been performed correctly by a correct key device.

Means to Solve the Problems

In order to solve the above-described problem, in a key exchange method of this invention, $s_1$ and $s_2$ are assumed to be random numbers which are mutually prime and $s'_1$ and $s'_2$ are assumed to be random numbers which satisfy a predetermined relationship with the random numbers $s_1$ and $s_2$, in a storage of a key device, a secret key of a terminal device is stored, and the key exchange method includes: a random number generating step in which the terminal device generates the random numbers $s_1$, $s_2$, $s'_1$, and $s'_2$; a public keys randomizing step in which the terminal device generates first randomized public keys information obtained by randomizing a public key of the terminal device and a public key of another terminal device by using the random number $s_1$ and second randomized public keys information obtained by randomizing the public key of the terminal device and the public key of the other terminal device by using the random number $s_2$; a proxy calculation step in which the key device calculates a first commission result from the first randomized public keys information by using the secret key and calculates a second commission result from the second randomized public keys information by using the secret key; a verification step in which the terminal device calculates a first verification value from the first commission result by using the random number $s_2$, calculates a second verification value from the second commission result by using the random number $s_1$, and verifies whether or not the first verification value and the second verification value coincide with each other; and a common key calculation step in which, if the first verification value and the second verification value coincide with each other, the terminal device calculates a common key from the first commission result and the second commission result by using the random numbers $s'_1$ and $s'_2$.

Effects of the Invention

Since a public key which is sent from a terminal device to a key device has been randomized, the key device cannot identify the other terminal device with which the terminal device, which has commissioned the key device to perform calculation, performs key exchange. Moreover, since the terminal device commissions proxy calculation after randomizing a public key of the other terminal device, the key device cannot calculate a common key.

Furthermore, since the terminal device sends a public key thereof and a public key of the other party which has been randomized to the key device and the key device returns processing results about both of them, if a correct key device has not been selected or the key device has not performed processing correctly, an error occurs between two values obtained as a result of the commission which are necessary for key exchange. By checking the presence or absence of the error, the terminal device can confirm that the key device is a correct key device and processing has been performed correctly.

Therefore, the key exchange technique of this invention does not allow the key device to calculate a common key and allows a client to confirm that processing has been performed correctly by a correct key device.

DETAILED DESCRIPTION OF THE EMBODIMENTS

Figure 1:
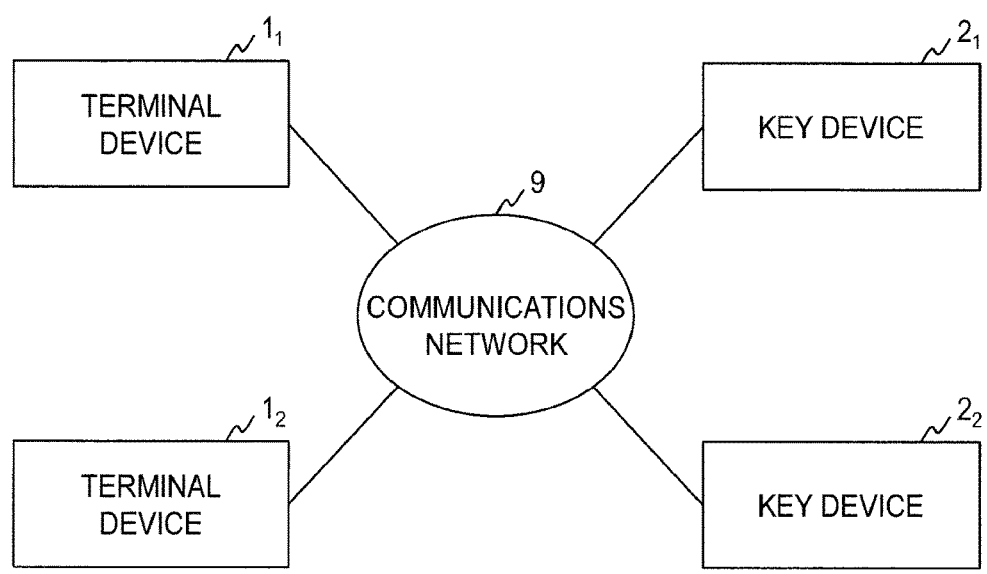
FIG. 1 is a diagram illustrating the functional configuration of a key exchange system of a first embodiment.

Hereinafter, embodiments of this invention will be described in detail. Incidentally, in the drawings, component units having the same function are identified with the same reference numerals and overlapping explanations are omitted.

[Proxy Calculation Using Self-Correction]

Proxy calculation using self-correction, in particular, group homomorphism proxy calculation will be described. Assume that there are two groups G and H and a homomorphism therebetween is F: G→H. Then, a binary operation defined by G and H does not lose generality also as multiplication. A method by which a client terminal U sends g∈G to a proxy calculation device P with g∈G being in a concealed state and commissions the proxy calculation device P to calculate F(g) will be described below.

(1) The client terminal U calculates $F(g_0)$ for an appropriate element $g_0 \in G$ which is not a unit element.

(2) The client terminal U determines random integers $s_1$, $s_2 \in Z$ such that the random integers $s_1$ and $s_2$ are mutually prime and sets $s'_1$ and $s'_2$ such that $s'_1$ and $s'_2$ satisfy $s_1 s'_1 + s_2 s'_2 = 1$.

(3) The client terminal U sets arbitrary elements $g_1, g_2 \in G$ which are not unit elements and sends two pairs $(g_1^{-1}, g_1 g^{s_1})$ and $(g_2^{-1}, g_2 g^{s_2})$ to the proxy calculation device P.

(4) The proxy calculation device P calculates $\zeta_1 = F(g_1^{-1}) F(g_1 g^{s_1})$ and $\zeta_2 = F(g_2^{-1}) F(g_2 g^{s_2})$ and sends $\zeta_1$ and $\zeta_2$ to the client terminal U.

(5) The client terminal U checks whether or not $\zeta_1^{s_2} + \zeta_2^{s_1}$. If $\zeta_1^{s_2} = \zeta_2^{s_1}$ does not hold, the client terminal U goes back to (1). If $\zeta_1^{s_2} = \zeta_2^{s_1}$ holds, the client terminal U calculates $\zeta_1^{s'_1} \zeta_2^{s'_2} = F(g^{s_1 s'_1 + s_2 s'_2}) = F(g)$.

First Embodiment

A first embodiment is a DHM key exchange system using self-correction.

The key exchange system of the present embodiment includes, as depicted in FIG. 1, for example, two terminal devices $1_1$ and $1_2$ that perform exchange of a common key and two key devices $2_1$ and $2_2$ corresponding to the terminal devices. In the present embodiment, an example in which the two terminal devices 1 perform key exchange will be described, but the number of terminal devices 1 and the number of key devices 2, the terminal devices 1 and the key devices 2 being included in the key exchange system, are not limited. The terminal devices 1 and the key devices 2 are connected in such a way that they can communicate with one another via a communications network 9. The communications network 9 can be configured as, for example, the Internet, a wide area network (WAN), a local area network (LAN), a dedicated line, a public switched telephone network, or a mobile telephone communications network.

Figure 2A:
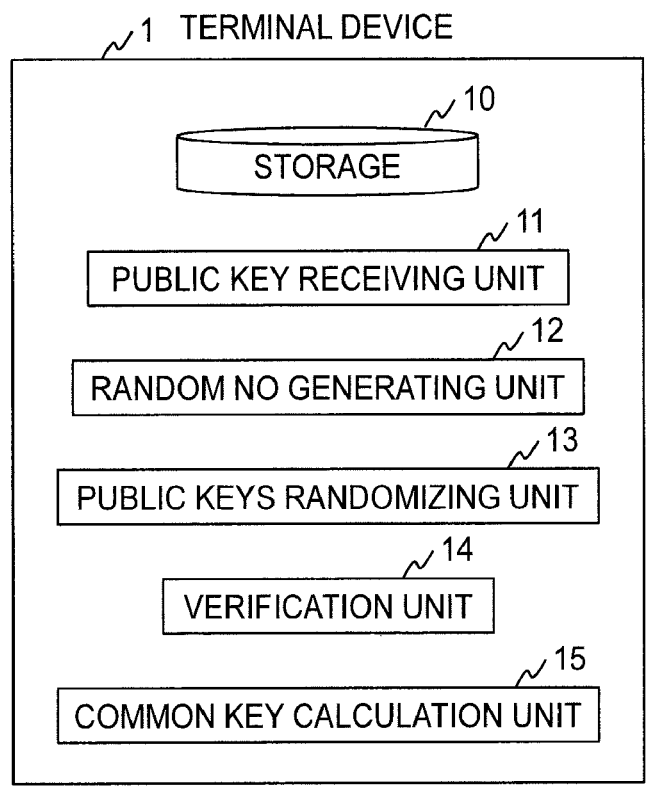
FIG. 2A is a diagram illustrating the functional configuration of a terminal device.

The terminal device 1 includes, as depicted in FIG. 2A, for example, a storage 10, a public key receiving unit 11, a random number generating unit 12, a public keys randomizing unit 13, a verification unit 14, and a common key calculation unit 15.

Figure 2B:
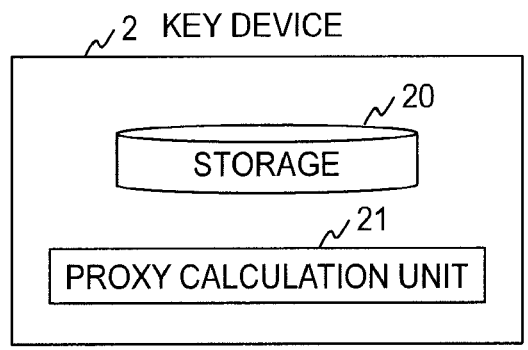
FIG. 2B is a diagram illustrating the functional configuration of a key device.

The key device 2 includes, as depicted in FIG. 2B, for example, a storage 20 and a proxy calculation unit 21.

The terminal device 1 and the key device 2 are each a special device configured as a result of a special program being read into a publicly known or dedicated computer including, for example, a central processing unit (CPU), a main storage (random access memory: RAM), and so forth. The terminal device 1 and the key device 2 execute each processing under control of the central processing unit, for example. The data input to the terminal device 1 and the key device 2 and the data obtained by each processing are stored in the main storage, for example, and the data stored in the main storage is read therefrom when necessary and used for another processing. Moreover, at least part of each processing unit of the terminal device 1 and the key device 2 may be configured by using hardware such as an integrated circuit.

Figure 3:
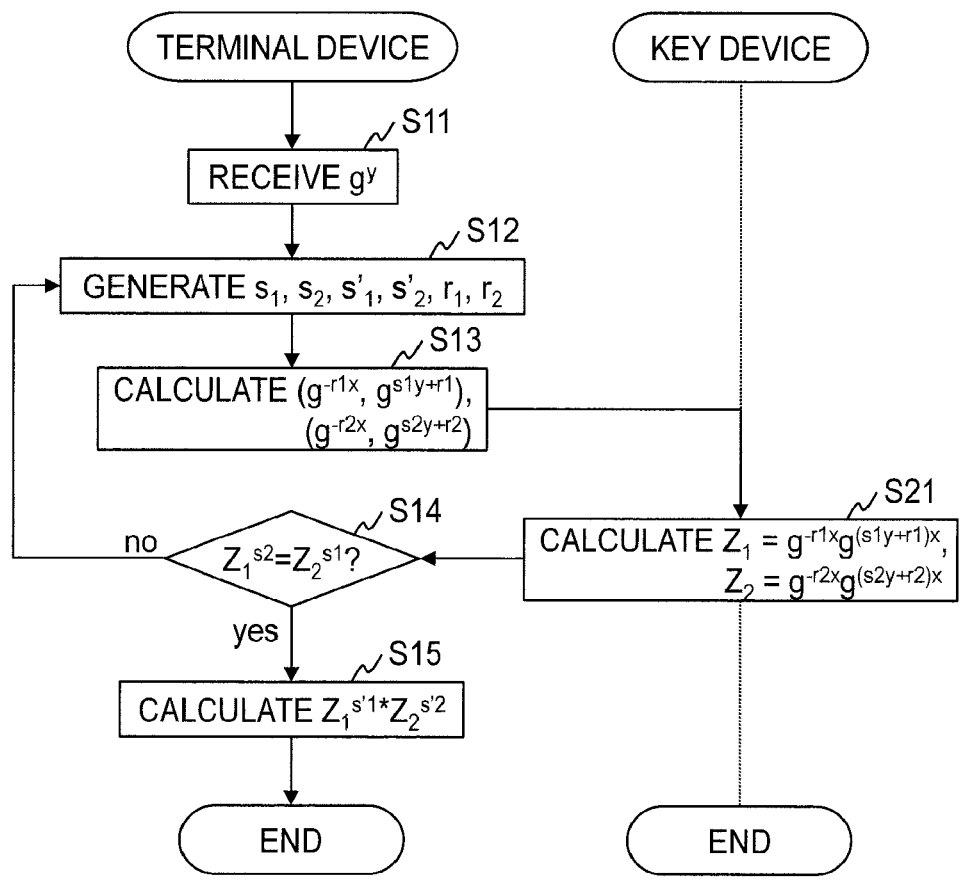
FIG. 3 is a diagram illustrating a processing flow of a key exchange method of the first embodiment.

Hereinafter, with reference to FIG. 3, a processing procedure of a key exchange method of the present embodiment will be described. In FIG. 3, only processing of the terminal device $1_1$ and the key device $2_1$ is depicted, but the terminal device $1_2$ and the key device $2_2$ perform similar processing.

In the following description, g is assumed to be an element of a group G whose order is a prime number p, $Z_p$ is assumed to be a factor ring of the order p, and an assumption is made that x, y$\in Z_p$ holds.

In the storage 20 of the key device $2_1$, a secret key x of the terminal device $1_1$ is stored. In the storage 10 of the terminal device $1_1$, a public key $g^x$ of the terminal device $1_1$ is stored. Likewise, in the storage 20 of the key device $2_2$, a secret key y of the terminal device $1_2$ is stored. In the storage 10 of the terminal device $1_2$, a public key $g^y$ of the terminal device $1_2$ is stored.

In Step S11, the public key receiving unit 11 of the terminal device $1_2$ sends the public key $g^y$ of the terminal device $1_2$ to the terminal device $1_1$. The public key receiving unit 11 of the terminal device $1_1$ receives the public key $g^y$ from the terminal device $1_2$. Likewise, the public key receiving unit 11 of the terminal device $1_1$ sends the public key $g^x$ of the terminal device $1_1$ to the terminal device $1_2$. The public key receiving unit 11 of the terminal device $1_2$ receives the public key $g^x$ from the terminal device $1_1$.

In Step S12, the random number generating unit 12 of the terminal device $1_1$ generates random numbers $s_1$, $s_2$, $s'_1$, $s'_2$, $r_1$, and $r_2$. Here, $s_1$ and $s_2$ are assumed to be mutually prime and satisfy $s_1 s'_1 + s_2 s'_2 = 1$. $r_1$ and $r_2$ may be arbitrary numbers. Likewise, the random number generating unit 12 of the terminal device $1_2$ generates $s_3$, $s_4$, $s'_3$, $s'_4$, $r_3$, and $r_4$. Here, $s_3$ and $s_4$ are assumed to be mutually prime and satisfy $s_3 s'_3 + s_4 s'_4 = 1$. $r_3$ and $r_4$ may be arbitrary numbers.

In Step S13, the public keys randomizing unit 13 of the terminal device $1_1$ calculates, by Formula (1), values (hereinafter referred to as first randomized public keys information) obtained by randomizing a set of the public key $g^x$ of the terminal device $1_1$ and the public key $g^y$ of the terminal device $1_2$ by using the random numbers $s_1$ and $r_1$. Moreover, the public keys randomizing unit 13 calculates, by Formula (2), values (hereinafter referred to as second randomized public keys information) obtained by randomizing a set of the public key $g^x$ of the terminal device $1_1$ and the public key $g^y$ of the terminal device $1_2$ by using the random numbers $s_2$ and $r_2$. The public keys randomizing unit 13 sends a pair of the calculated first randomized public keys information and second randomized public keys information to the key device $2_1$.

$$(g^{-r_1 x}, g^{s_1 y + r_1}) \quad (1)$$

$$(g^{-r_2 x}, g^{s_2 y + r_2}) \quad (2)$$

Specifically, the first randomized public keys information can be calculated in the following manner. $g^x$ is raised to the $-r_1$-th power to calculate $g^{-r_1 x}$. $g^y$ is raised to the $s_1$-th power to calculate $g^{s_1 y}$. g is raised to the $r_1$-th power to calculate $g^{r_1}$. $g^{r_1}$, $g^{s_1 y}$ and $g^{r_1}$ are multiplied together to calculate $g^{s_1 y + r_1}$. The second randomized public keys information can also be calculated in a similar manner.

Likewise, the public keys randomizing unit 13 of the terminal device $1_2$ calculates, by Formula (3), values (hereinafter referred to as first randomized public keys information) obtained by randomizing a set of the public key $g^x$ of the terminal device $1_1$ and the public key $g^y$ of the terminal device $1_2$ by using the random numbers $s_3$ and $r_3$. Moreover, the public keys randomizing unit 13 calculates, by Formula (4), values (hereinafter referred to as second randomized public keys information) obtained by randomizing a set of the public key $g^x$ of the terminal device 1 and the public key $g^y$ of the terminal device $1_2$ by using the random numbers $s_4$ and $r_4$. The public keys randomizing unit 13 sends a pair of the calculated first randomized public keys information and second randomized public keys information to the key device $2_2$.

$$(g^{-r_3 x}, g^{s_3 y + r_3}) \quad (3)$$

$$(g^{-r_4 x}, g^{s_4 y + r_4}) \quad (4)$$

In Step S21, the proxy calculation unit 21 of the key device $2_1$ calculates, by Formula (5), a value $Z_1$ (hereinafter referred to as a first commission result) necessary for calculation of a common key from the first randomized public keys information by using the secret key x. Moreover, the proxy calculation unit 21 calculates, by Formula (6), a value $Z_2$ (hereinafter referred to as a second commission result) necessary for calculation of the common key from the second randomized public keys information by using the secret key x. The proxy calculation unit 21 sends the calculated first commission result $Z_1$ and second commission result $Z_2$ to the terminal device $1_1$.

$$Z_1 = g^{-r_1 x} g^{(s_1 y + r_1) x} \quad (5)$$

$$Z_2 = g^{-r_2 x} g^{(s_2 y + r_2) x} \quad (6)$$

Specifically, the first commission result $Z_1$ can be calculated in the following manner. $g^{s_1 y + r_1}$ is raised to the x-th power to calculate $g^{(s_1 y + r_1) x}$. $g^{-r_1 x}$ and $g^{(s_1 y + r_1) x}$ are multiplied together to calculate $g^{-r_1 x} g^{(s_1 y + r_1) x}$. The second commission result $Z_2$ can also be calculated in a similar manner.

Likewise, the proxy calculation unit 21 of the key device $2_2$ calculates, by Formula (7), a value $Z_3$ (hereinafter referred to as a first commission result) necessary for calculation of the common key from the first randomized public keys information by using the secret key y. Moreover, the proxy calculation unit 21 calculates, by Formula (8), a value $Z_4$ (hereinafter referred to as a second commission result) necessary for calculation of the common key from the second randomized public keys information by using the secret key y. The proxy calculation unit 21 sends the calculated first commission result $Z_3$ and second commission result $Z_4$ to the terminal device $1_2$.

$$Z_3 = g^{-r_3 x} g^{(s_3 y + r_3) x} \quad (7)$$

$$Z_4 = g^{-r_4 x} g^{(s_4 y + r_4) x} \quad (8)$$

In Step S14, the verification unit 14 of the terminal device $1_1$ verifies, by Formula (9), whether or not a value (hereinafter referred to as a first verification value) obtained by raising the first commission result $Z_1$ to the $s_2$-th power and a value (hereinafter referred to as a second verification value) obtained by raising the second commission result $Z_2$ to the $s_1$-th power coincide with each other. Likewise, the verification unit 14 of the terminal device $1_2$ verifies, by Formula (10), whether or not a value (hereinafter referred to as a first verification value) obtained by raising the first commission result $Z_3$ to the $s_4$-th power and a value (hereinafter referred to as a second verification value) obtained by raising the second commission result $Z_4$ to the $s_3$-th power coincide with each other. If the first verification value and the second verification value coincide with each other, the processing proceeds to Step S15. If the first verification value and the second verification value do not coincide with each other, the processing is returned to Step S12.

$$Z_1^{s2} = Z_2^{s1} \qquad (9)$$

$$Z_3^{s4} = Z_4^{s3} \qquad (10)$$

In Step S15, the common key calculation unit 15 of the terminal device $1_1$ calculates, by Formula (11), a common key K from the first commission result $Z_1$ and the second commission result $Z_2$ by using the random numbers $s'_1$ and $s'_2$. Likewise, the common key calculation unit 15 of the terminal device $1_2$ calculates, by Formula (12), the common key K from the first commission result $Z_3$ and the second commission result $Z_4$ by using the random numbers $s'_3$ and $s'_4$.

$$K = Z_1^{s'1} * Z_2^{s'2} \qquad (11)$$

$$K = Z_3^{s'3} * Z_4^{s'4} \qquad (12)$$

The present embodiment may be modified in the following manner. In Step S13, the public keys randomizing unit 13 of the terminal device $1_1$ sends, to the key device $2_1$, only $g^{s1y+r1}$ as the first randomized public keys information and only $g^{s2y+r2}$ as the second randomized public keys information. At this time, the public keys randomizing unit 13 holds $g^{-r1x}$ and $g^{-r2x}$. In Step S21, the proxy calculation unit 21 of the key device $2_1$ calculates a first commission result $Z'_1$ and a second commission result $Z'_2$ by Formula (13).

$$Z'_1 = g^{(s1y+r1)x},$$

$$Z'_2 = g^{(s2y+r2)x} \qquad (13)$$

Then, in Step S14, the verification unit 14 of the terminal device $1_1$ calculates a first commission result $Z_1$ and a second commission result $Z_2$ by Formula (14).

$$Z_1 = g^{-r1x} Z'_1 = g^{-r1x} g^{(s1y+r1)x},$$

$$Z_2 = g^{-r2x} Z'_2 = g^{-r2x} g^{(s2y+r2)x} \qquad (14)$$

Second Embodiment

A second embodiment is an authentication key exchange system using self-correction and a digital signature.

Figure 4:
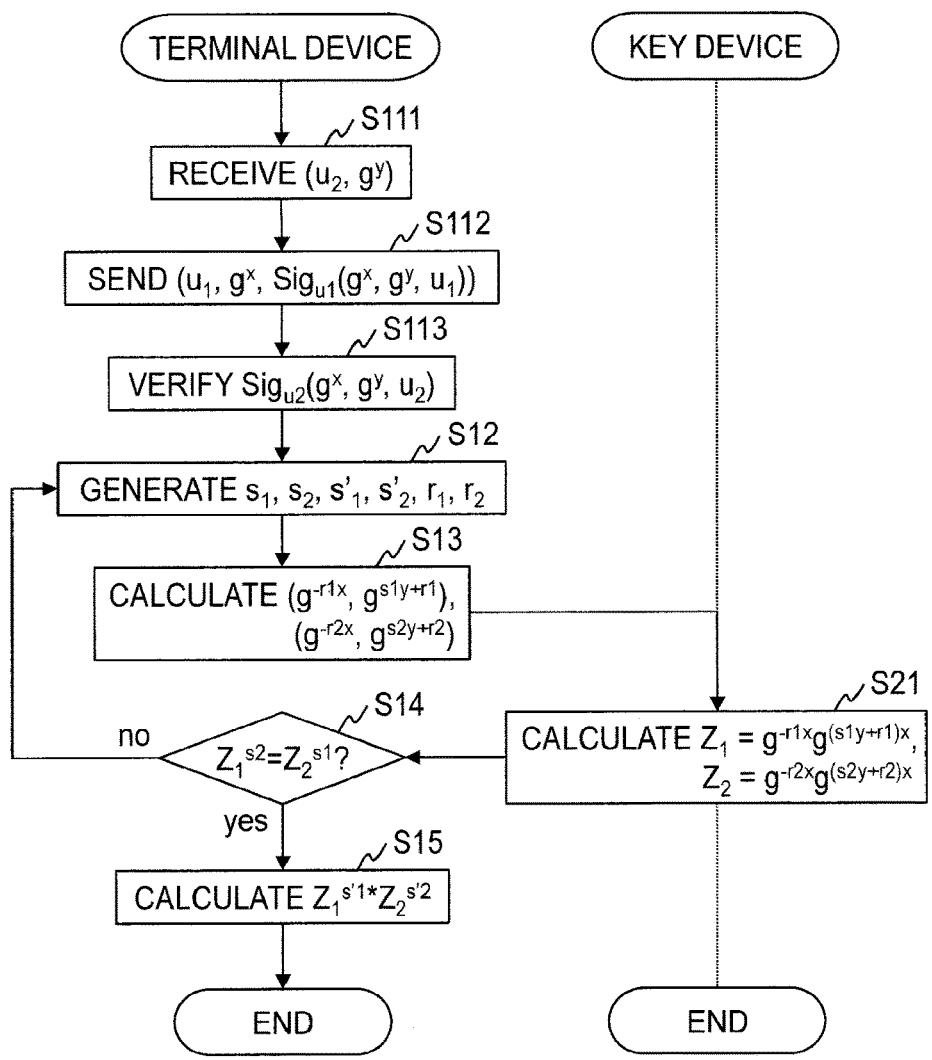
FIG. 4 is a diagram illustrating a processing flow of a key exchange method of a second embodiment.

Hereinafter, with reference to FIG. 4, a processing procedure of a key exchange method of the present embodiment will be described. In the following description, a difference from the above-described first embodiment will be mainly explained.

In the present embodiment, in the storage 10 of the terminal device $1_1$, a public key $g^x$ of the terminal device $1_1$, a signature key $\text{Sig}_{u1}$ of the terminal device $1_1$, a verification key $\text{Ver}_{u2}$ of the terminal device $1_2$, and a user identifier $u_1$ of the terminal device $1_1$ are stored. In the storage 20 of the key device $2_1$, as in the case of the first embodiment, a secret key x of the terminal device $1_1$ is stored. Likewise, in the storage 10 of the terminal device $1_2$, a public key $g^y$ of the terminal device $1_2$, a signature key $\text{Sig}_{u2}$ of the terminal device $1_2$, a verification key $\text{Ver}_{u1}$ of the terminal device $1_1$, and a user identifier $u_2$ of the terminal device $1_2$ are stored. In the storage 20 of the key device $2_2$, as in the case of the first embodiment, a secret key y of the terminal device $1_2$ is stored.

In Step S111, the public key receiving unit 11 of the terminal device $1_2$ sends a set ($u_2$, $g^y$) of the user identifier $u_2$ and the public key $g^y$ to the terminal device $1_1$. The public key receiving unit 11 of the terminal device $1_1$ receives ($u_2$, $g^y$) from the terminal device $1_2$. Likewise, the public key receiving unit 11 of the terminal device $1_1$ sends a set ($u_1$, $g^x$) of the user identifier $u_1$ and the public key $g^x$ to the terminal device $1_2$. The public key receiving unit 11 of the terminal device $1_2$ receives ($u_1$, $g^x$) from the terminal device $1_1$.

In Step S112, the public key receiving unit 11 of the terminal device $1_1$ generates a signature $\text{Sig}_{u1}(g^x, g^y, u_1)$ for a set of the public key $g^x$, the public key $g^y$, and the user identifier $u_1$ by using the signature key $\text{Sig}_{u1}$ and sends ($u_1$, $g^x$, $\text{Sig}_{u1}(g^x, g^y, u_1)$) to the terminal device $1_2$. The public key receiving unit 11 of the terminal device $1_2$ receives ($u_1$, $g^x$, $\text{Sig}_{u1}(g^x, g^y, u_1)$) from the terminal device $1_1$. Likewise, the public key receiving unit 11 of the terminal device $1_2$ generates a signature $\text{Sig}_{u2}(g^x, g^y, u_2)$ for a set of the public key $g^x$, the public key $g^y$, and the user identifier $u_2$ by using the signature key $\text{Sig}_{u2}$ and sends ($u_2$, $g^y$, $\text{Sig}_{u2}(g^x, g^y, u_2)$) to the terminal device $1_1$. The public key receiving unit 11 of the terminal device $1_1$ receives ($u_2$, $g^y$, $\text{Sig}_{u2}(g^x, g^y, u_2)$) from the terminal device $1_2$.

In Step S113, the public key receiving unit 11 of the terminal device $1_1$ verifies the signature $\text{Sig}_{u2}(g^x, g^y, u_2)$ by using the verification key $\text{Ver}_{u2}$. Likewise, the public key receiving unit 11 of the terminal device $1_2$ verifies the signature $\text{Sig}_{u1}(g^x, g^y, u_1)$ by using the verification key $\text{Ver}_{u1}$. If the signature $\text{Sig}_{u2}(g^x, g^y, u_2)$ and the signature $\text{Sig}_{u1}(g^x, g^y, u_1)$ are correct, the processing proceeds to Step S12. If the signature $\text{Sig}_{u2}(g^x, g^y, u_2)$ or the signature $\text{Sig}_{u1}(g^x, g^y, u_1)$ is not correct, the processing is ended.

The processing in Steps S12 to S15 and S21 which follow is similar to that of the first embodiment.

Third Embodiment

A third embodiment is an MQV key exchange system using self-correction.

Figure 5:
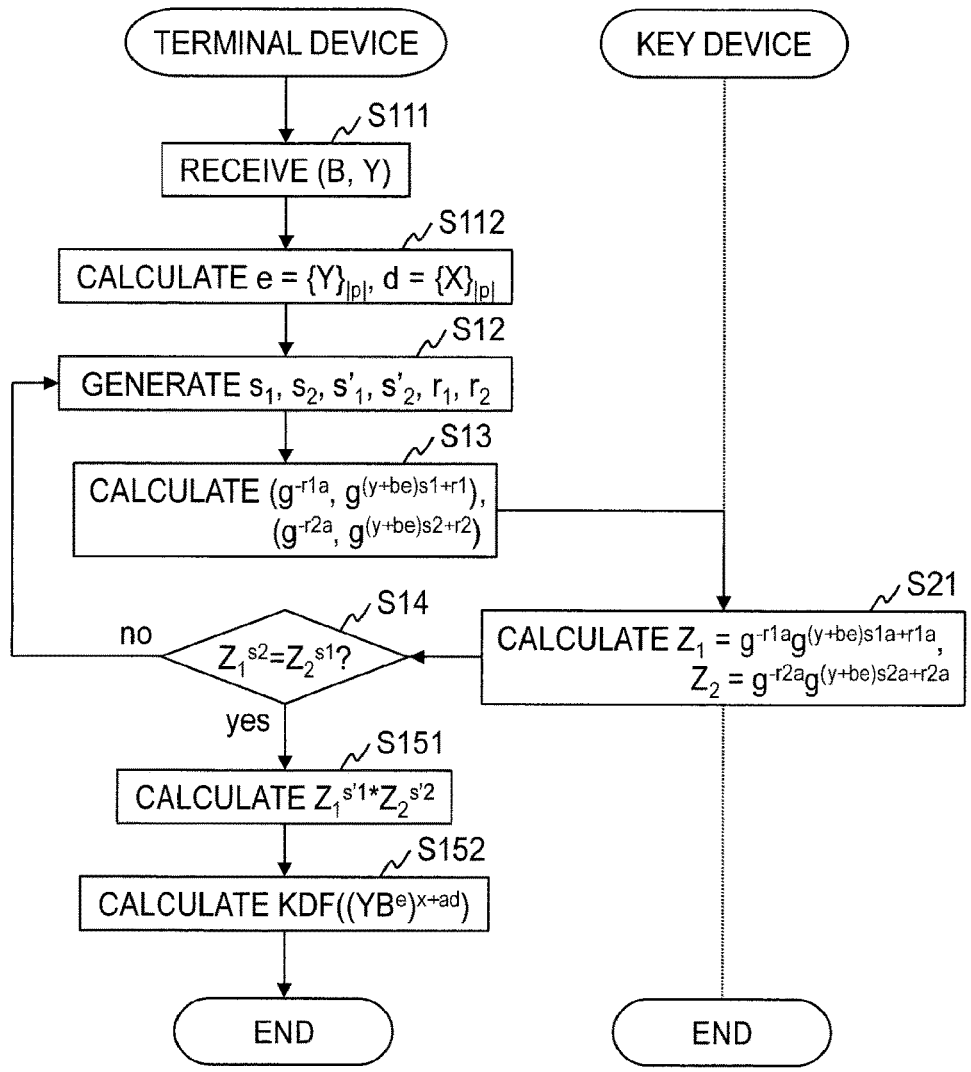
FIG. 5 is a diagram illustrating a processing flow of a key exchange method of a third embodiment.

Hereinafter, with reference to FIG. 5, a processing procedure of a key exchange method of the present embodiment will be described. In the following description, a difference from the above-described first embodiment will be mainly explained.

In the present embodiment, in the storage 20 of the key device $2_1$, a fixed secret key $a \in Z_p$ of the terminal device $1_1$ is stored. In the storage 10 of the terminal device $1_1$, a fixed public key $A = g^a$ of the terminal device $1_1$, a temporary secret key $x \in Z_p$ of the terminal device $1_1$, and a temporary public key $X = g^x$ of the terminal device $1_1$ are stored. Likewise, in the storage 20 of the key device $2_2$, a fixed secret key $b \in Z_p$ of the terminal device $1_2$ is stored. In the storage 10 of the terminal device $1_2$, a fixed public key $B = g^b$ of the terminal device $1_2$, a temporary secret key $y \in Z_p$ of the terminal device $1_2$, and a temporary public key $Y = g^y$ of the terminal device $1_2$ are stored.

In Step S111, the public key receiving unit 11 of the terminal device $1_2$ sends a set (B, Y) of the fixed public key B and the temporary public key Y to the terminal device $1_1$. The public key receiving unit 11 of the terminal device $1_1$ receives (B, Y) from the terminal device $1_2$. Likewise, the public key receiving unit 11 of the terminal device $1_1$ sends a set (A, X) of the fixed public key A and the temporary public key X to the terminal device $1_2$. The public key receiving unit 11 of the terminal device $1_2$ receives (A, X) from the terminal device $1_1$.

In Step S112, the public key receiving unit 11 of the terminal device $1_1$ calculates a value $e=\{Y\}_{|p|}$ and a value $d=\{X\}_{|p|}$. Here, $\{\bullet\}_{|p|}$ means a higher-order p bit when • is expressed in bits. Likewise, the public key receiving unit 11 of the terminal device $1_2$ calculates a value $e=\{Y\}_{|p|}$ and a value $d=\{X\}_{|p|}$.

In Step S13, the public keys randomizing unit 13 of the terminal device $1_1$ calculates first randomized public keys information by Formula (15). Moreover, the public keys randomizing unit 13 calculates second randomized public keys information by Formula (16). The public keys randomizing unit 13 sends a pair of the calculated first randomized public keys information and second randomized public keys information to the key device $2_1$.

$$(A^{-r1}, (YB^e)^{s1}g^{r1}) = (g^{-r1a}, g^{(y+be)s1+r1}) \tag{15}$$

$$(A^{-r2}, (YB^e)^{s2}g^{r2}) = (g^{-r2a}, g^{(y+be)s2+r2}) \tag{16}$$

Specifically, the first randomized public keys information can be calculated in the following manner. $g^a$ is raised to the $-r_1$-th power to calculate $g^{-r_1 a}$. $g^b$ is raised to the e-th power to calculate $g^{be}$, which is multiplied by $g^y$ to calculate $g^{y+be}$. $g^{y+be}$ is raised to the $s_1$-th power to calculate $g^{(y+be)s1}$. g is raised to the $r_1$-th power to calculate $g^{r1}$, and $g^{(y+be)s1}$ and $g^{r1}$ are multiplied together to calculate $g^{(y+be)s1+r1}$. The second randomized public keys information can also be calculated in a similar manner.

Likewise, the public keys randomizing unit 13 of the terminal device $1_2$ calculates first randomized public keys information by Formula (17). Moreover, the public keys randomizing unit 13 calculates second randomized public keys information by Formula (18). The public keys randomizing unit 13 sends a pair of the calculated first randomized public keys information and second randomized public keys information to the key device $2_2$.

$$(B^{-r3}, (XA^d)^{s3}g^{r3}) = (g^{-r3b}, g^{(x+ad)s3+r3}) \tag{17}$$

$$(B^{-r4}, (XA^d)^{s4}g^{r4}) = (g^{-r4b}, g^{(x+ad)s4+r4}) \tag{18}$$

In Step S21, the proxy calculation unit 21 of the key device $2_1$ calculates a first commission result $Z_1$ by Formula (19). Moreover, the proxy calculation unit 21 calculates a second commission result $Z_2$ by Formula (20). The proxy calculation unit 21 sends the calculated first commission result $Z_1$ and second commission result $Z_2$ to the terminal device $1_1$.

$$Z_1 = g^{-r1a}g^{(y+be)s1a+r1a} \tag{19}$$

$$Z_2 = g^{-r2a}g^{(y+be)s2a+r2a} \tag{20}$$

Likewise, the proxy calculation unit 21 of the key device $2_2$ calculates a first commission result $Z_3$ by Formula (21). Moreover, the proxy calculation unit 21 calculates a second commission result $Z_4$ by Formula (22). The proxy calculation unit 21 sends the calculated first commission result $Z_3$ and second commission result $Z_4$ to the terminal device $1_2$.

$$Z_3 = g^{-r3b}g^{(x+ad)s3b+r3b} \tag{21}$$

$$Z_4 = g^{-r4b}g^{(x+ad)s4b+r4b} \tag{22}$$

In Step S151, the common key calculation unit 15 of the terminal device $1_1$ calculates, by Formula (23), a value $YB^{ea}$ from the first commission result $Z_1$ and the second commission result $Z_2$ by using the random numbers $s'_1$ and $s'_2$. Likewise, the common key calculation unit 15 of the terminal device $1_2$ calculates, by Formula (24), a value $XA^{db}$ from the first commission result $Z_3$ and the second commission result $Z_4$ by using the random numbers $s'_3$ and $s'_4$.

$$Z_1^{s'1} * Z_2^{s'2} = g^{(y+be)a} = YB^{ea} \tag{23}$$

$$Z_3^{s'3} * Z_4^{s'4} = g^{(x+ad)b} = XA^{db} \tag{24}$$

In Step S152, the common key calculation unit 15 of the terminal device $1_1$ calculates a common key K by Formula (25). Incidentally, KDF is a key derivation function, which is a function that randomizes an input value. Likewise, the common key calculation unit 15 of the terminal device $1_2$ calculates the common key K by Formula (26).

$$K = KDF((YB^e)^{x+ad}) \tag{25}$$

$$K = KDF((XA^d)^{y+be}) \tag{26}$$

Specifically, $(YB^e)^{x+ad}$ can be calculated in the following manner. $YB^e$ is raised to the x-th power to calculate $YB^{ex}$. $YB^{ea}$ is raised to the d-th power to calculate $YB^{ead}$. $YB^{ex}$ and $YB^{ead}$ are multiplied together to calculate $(YB^e)^{x+ad}$. $(XA^d)^{y+be}$ can also be calculated in a similar manner.

The present embodiment may be modified in the following manner. In Step S13, the public keys randomizing unit 13 of the terminal device $1_1$ sends, to the key device $2_1$, only $g^{(y+be)s1+r1}$ as the first randomized public keys information and only $g^{(y+be)s2+r2}$ as the second randomized public keys information. At this time, the public keys randomizing unit 13 holds $g^{-r1a}$ and $g^{-r2a}$. In Step S21, the proxy calculation unit 21 of the key device $2_1$ calculates a first commission result $Z_1'$ and a second commission result $Z_2'$ by Formula (27).

$$Z'_1 = g^{(y+be)s1a+r1a},$$

$$Z'_2 = g^{(y+be)s2a+r2a} \tag{27}$$

Then, in Step S14, the verification unit 14 of the terminal device a first commission result $Z_1$ and a second commission result $Z_2$ by Formula (28).

$$Z_1 = g^{-r1a}Z'_1 = g^{-r1a}g^{(y+be)s1a+r1a},$$

$$Z_2 = g^{-r2a}Z'_2 = g^{-r2a}g^{(y+be)s2a+r2a} \tag{28}$$

Fourth Embodiment

A fourth embodiment is an HMQV key exchange system using self-correction.

Figure 6:
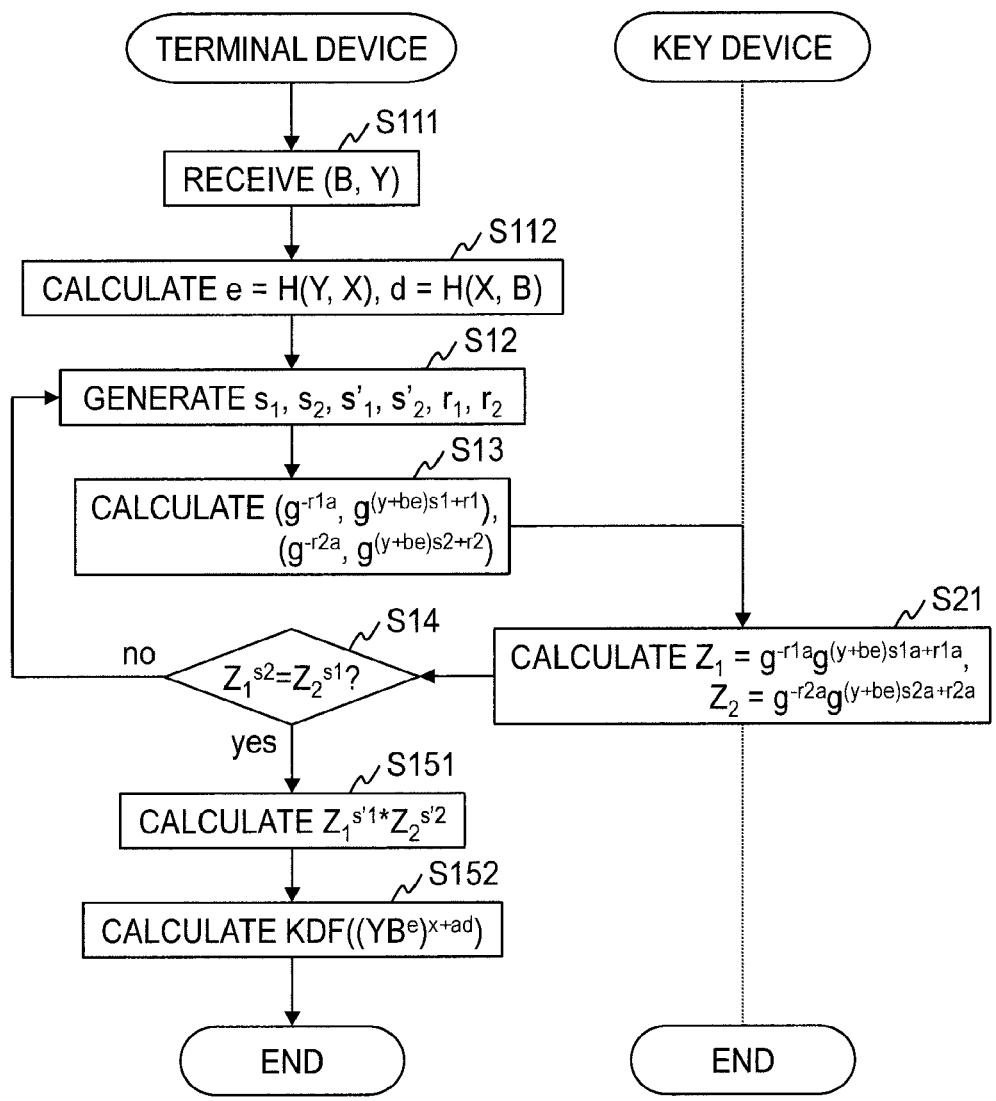
FIG. 6 is a diagram illustrating a processing flow of a key exchange method of a fourth embodiment.

Hereinafter, with reference to FIG. 6, a processing procedure of a key exchange method of the present embodiment will be described. In the following description, a difference from the above-described third embodiment will be mainly explained.

In Step S112, the public key receiving unit 11 of the terminal device $1_1$ calculates a value $e=H(Y, X)$ and a value $d=H(X, B)$. Here, $H(\bullet)$ is a cryptographic hash function. Examples of the cryptographic hash function include SHA-1, SHA-2, and so forth. Likewise, the public key receiving unit 11 of the terminal device $1_2$ calculates a value $e=H(Y, X)$ and a value $d=H(X, B)$.

The present embodiment differs from the third embodiment only in that the values e and d are determined by the hash function and the other processing is similar to that of the third embodiment.

Fifth Embodiment

A fifth embodiment is an id-id AKE method using self-correction. The present embodiment is a configuration in which, in particular, the key device holds a secret key and the terminal device generates a short-term secret key.

Figure 7:
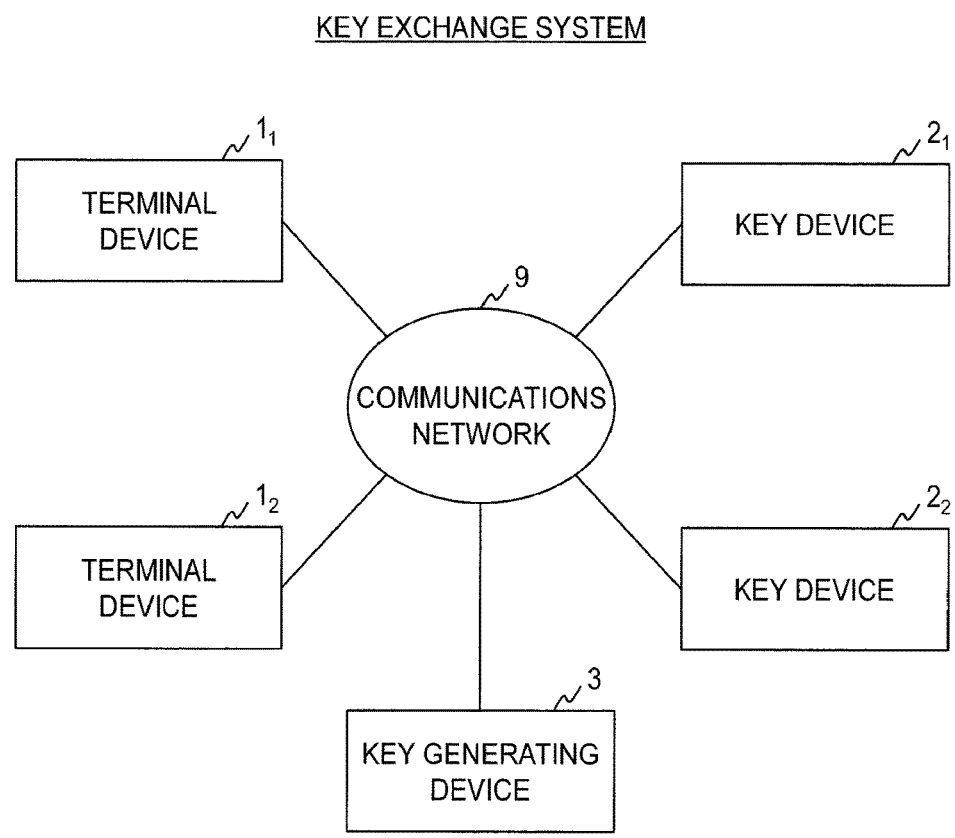
FIG. 7 is a diagram illustrating the functional configuration of a key exchange system of a fifth embodiment.

In addition to the terminal devices $1_1$ and $1_2$ and the key devices $2_1$ and $2_2$, as depicted in FIG. 7, for example, a key exchange system of the present embodiment includes a key generating device 3.

In the following description, κ is assumed to be a security parameter, $G_1$, $G_2$, and $G_T$ are assumed to be cyclic groups whose order is a prime number q with κ bit length, and $g_1$, $g_2$, and $g_T$ are assumed to be generators of the groups $G_1$, $G_2$, and $G_T$, respectively. An assumption is made that e: $G_1 \times G_2 \to G_T$ is pairing. Here, $g_T = e(g_1, g_2)$ is assumed to be satisfied. An assumption is made that each of H: $\{0, 1\}^* \to \{0,1\}^\kappa$, $H_1$: $\{0, 1\}^* \to G_1$, and $H_2$: $\{0, 1\}^* \to G_2$ is a cryptographic hash function.

For a natural number m which is greater than or equal to 2, m polynomials $p_i \in Z_q[u_0, u_1, v_0, v_1]$ (i=1, . . . , m) are given as in Formula (29). Incidentally, $c_{i,0,0}$, $c_{i,0,1}$, $c_{i,1,0}$, and $c_{i,1,1}$ may be constants or may be numbers which are determined depending on a short-term public key, a public key, a user ID, or the like.

$$p_i(u_0, u_1, v_0, v_1) = c_{i,0,0}u_0v_0 + c_{i,0,1}u_0v_1 + c_{i,1,0}u_1v_0 + c_{i,1,1}u_1v_1 \quad (29)$$

$$= (u_0, u_1)\begin{pmatrix} c_{i,0,0} & c_{i,0,1} \\ c_{i,1,0} & c_{i,1,1} \end{pmatrix}\begin{pmatrix} v_0 \\ v_1 \end{pmatrix}$$

Figure 8:
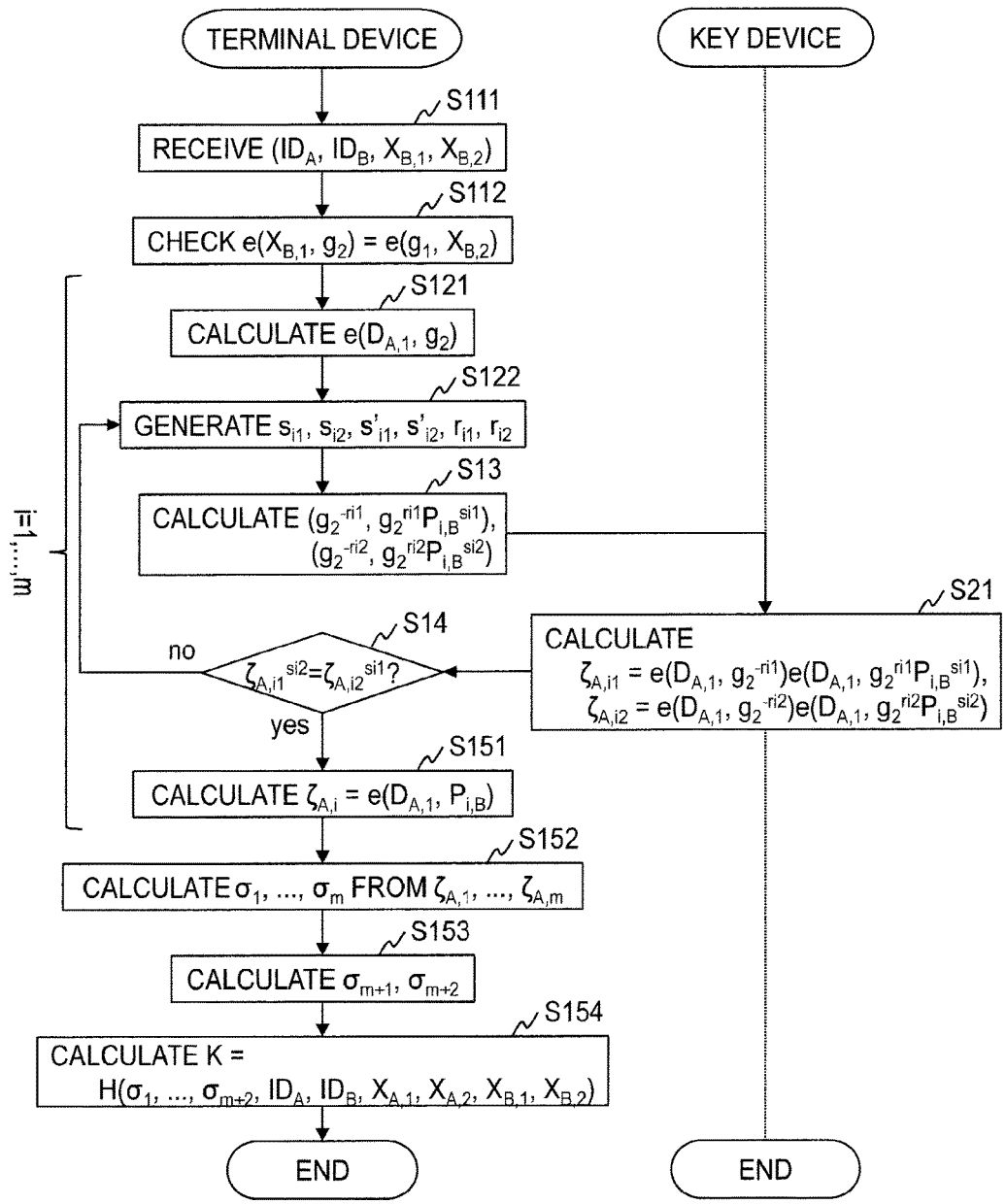
FIG. 8 is a diagram illustrating a processing flow of a key exchange method of the fifth embodiment.

Hereinafter, with reference to FIG. 8, a processing procedure of a key exchange method of the present embodiment will be described.

In the present embodiment, key generation is performed in the following manner. The key generating device 3 randomly selects a master secret key $z \in Z_q$, and calculates a pair of master public keys $(Z_1 = g_1^z \in G_1, Z_2 = g_2^z \in G_2)$ and makes the pair $(Z_1 = g_1^z \in G_1, Z_2 = g_2^z \in G_2)$ public. The terminal device $1_1$ calculates a pair of public keys $(Q_{A,1} = H_1(ID_A) \in G_1, Q_{A,2} = H_2(ID_A) \in G_2)$ by using an identifier $ID_A$ and makes the pair $(Q_{A,1} = H_1(ID_A) \in G_1, Q_{A,2} = H_2(ID_A) \in G_2)$ public. Likewise, the terminal device $1_2$ calculates a pair of public keys $(Q_{130} = H_1(ID_B) \in G_1, Q_{B,2} = H_2(ID_B) \in G_2)$ by using an identifier $ID_B$ and makes the pair $(Q_{B,1} = H_1(ID_B) \in G_1, Q_{B,2} = H_2(ID_B) \in G_2)$ public. The key generating device 3 calculates two pairs of secret keys $(D_{A,1} = Q_{A,1}^z, D_{A,2} = Q_{A,2}^z)$ and $(D_{B,1} = Q_{B,1}^z, D_{B,2} = Q_{B,2}^z)$ by using the two pairs of public keys $(Q_{A,1}, Q_{A,2})$ and $(Q_{B,1}, Q_{B,2})$ and distributes the pair of secret keys $(D_{A,1}, D_{A,2})$ to the key device $2_1$ and the pair of secret keys $(D_{B,1}, D_{B,2})$ to the key device $2_2$. The terminal device $1_1$ randomly selects a short-term secret key $Z_A \in Z_q$ and generates a pair of short-term public keys $(X_{A,1} = g_1^{x_A}, X_{A,2} = g_2^{x_A})$. Likewise, the terminal device $1_2$ randomly selects a short-term secret key $z_B \in Z_q$ and generates a pair of short-term public keys $(X_{B,1} = g_1^{x_B}, X_{B,2} = g_2^{x_B})$.

In Step S111, the public key receiving unit 11 of the terminal device $1_1$ sends information $(ID_A, ID_B, X_{A,1}, X_{A,2})$ formed of the identifiers and the short-term public keys to the terminal device $1_2$. The public key receiving unit 11 of the terminal device $1_2$ receives the information $(ID_A, ID_B, X_{A,1}, X_{A,2})$ from the terminal device $1_1$. Likewise, the public key receiving unit 11 of the terminal device $1_2$ sends information $(ID_A, ID_B, X_{B,1}, X_{B,2})$ formed of the identifiers and the short-term public keys to the terminal device $1_1$. The public key receiving unit 11 of the terminal device $1_1$ receives the information $(ID_A, ID_B, X_{B,1}, X_{B,2})$ from the terminal device $1_2$.

In Step S112, the public key receiving unit 11 of the terminal device $1_1$ checks whether or not Formula (30) holds. Likewise, the public key receiving unit 11 of the terminal device $1_2$ checks whether or not Formula (31) holds. If any one of these formulas is not correct, the processing is performed again from key generation.

$$e(X_{B,1}, g_2) = e(g_1, X_{B,2}) \quad (30)$$

$$e(X_{A,1}, g_2) = e(g_1, X_{A,2}) \quad (31)$$

In the present embodiment, processing in Steps S121, S122, S13, S21, S14, and S151 is repeatedly performed m times. In the following description, a processing procedure in the i (=1, . . . , m)-th repetition of the processing will be described.

In Step S121, the random number generating unit 12 of the terminal device $1_1$ performs calculation of Formula (32). Likewise, the random number generating unit 12 of the terminal device $1_2$ performs calculation of Formula (33).

$$e(D_{A,1}, g_2) = e(Q_{A,1}^z, g_2) \quad (32)$$
$$= e(Q_{A,1}, g_2^z)$$
$$= e(Q_{A,1}, Z_2)$$

$$e(g_1, D_{B,2}) = e(g_1, Q_{B,2}^z) \quad (33)$$
$$= e(g_1^z, Q_{B,2})$$
$$= e(Z_1, Q_{B,2})$$

In Step S122, the random number generating unit 12 of the terminal device $1_1$ generates random numbers $s_{i1}, s_{i2}, s'_{i1}, s'_{i2}, r_{i1}$, and $r_{i2}$. Here, $s_{i1}$ and $s_{i2}$ are assumed to be mutually prime and satisfy $s_{i1}s'_{i1} + s_{i2}s'_{i2} = 1$. An assumption is made that $r_{i1}$ and $r_{i2}$ are arbitrary nonzero integers. Likewise, the random number generating unit 12 of the terminal device $1_2$ generates $t_{i1}, t_{i2}, t'_{i1}, t'_{i2}, 1_{i1}$, and $1_{i2}$. Here, $t_{i1}$ and $t_{i2}$ are assumed to be mutually prime and satisfy $t_{i1}t'_{i1} + t_{i2}t'_{i2} = 1$. An assumption is made that $1_{i1}$ and $1_{i2}$ are arbitrary nonzero integers.

In Step S13, the public keys randomizing unit 13 of the terminal device $1_1$ calculates, by Formula (34), values (hereinafter referred to as first randomized public keys information) obtained by randomizing the public key $Q_{B,2}$ and the short-term public key $X_{B,2}$ of the terminal device $1_2$ by using the random numbers $s_{i1}$ and $r_{i1}$. Moreover, the public keys randomizing unit 13 calculates, by Formula (35), values (hereinafter referred to as second randomized public keys information) obtained by randomizing the public key $Q_{B,2}$ and the short-term public key $X_{B,2}$ of the terminal device $1_2$ by using the random numbers $s_{i2}$ and $r_{i2}$. The public keys randomizing unit 13 sends a pair of the calculated first randomized public keys information and second randomized public keys information to the key device $2_1$.

$$(g_2^{-r_{i1}}, g_2^{r_{i1}}P_{i,B}^{s_{i1}}) \quad (34)$$

$$(g_2^{-r_{i2}}, g_2^{r_{i2}}P_{i,B}^{s_{i2}}) \quad (35)$$

where $P_{i,B} = Q_{B,2}{}^{c_{i,0,0}} X_{B,2}{}^{c_{i,0,1}}$

Likewise, the public keys randomizing unit 13 of the terminal device $1_2$ calculates, by Formula (36), values (hereinafter referred to as first randomized public keys information) obtained by randomizing the public key $Q_{A,1}$ and the short-term public key $X_{A,1}$ of the terminal device $1_1$ by using the random numbers $t_{i1}$ and $1_{i1}$. Moreover, the public keys randomizing unit 13 calculates, by Formula (37), values (hereinafter referred to as second randomized public keys information) obtained by randomizing the public key $Q_{A,1}$ and the short-term public key $X_{A,1}$ of the terminal device $1_1$ by using the random numbers $t_{i2}$ and $1_{i2}$. The public keys randomizing unit 13 sends a pair of the calculated first randomized public keys information and second randomized public keys information to the key device $2_2$.

$$(g_1^{-1_{i1}}, g_1^{1_{i1}} P_{i,A}{}^{t_{i1}}) \quad (36)$$

$$(g_1^{-1_{i2}}, g_1^{1_{i2}} P_{i,A}{}^{t_{i2}}) \quad (37)$$

where $P_{i,A} = Q_{A,1}{}^{c_{i,0,0}} X_{A,1}{}^{c_{i,1,0}}$

In Step S21, the proxy calculation unit 21 of the key device $2_1$ calculates, by Formula (38), a value $\zeta_{A,i1}$ (hereinafter referred to as a first commission result) necessary for calculation of a common key from the first randomized public keys information by using the secret key $D_{A,1}$. Moreover, the proxy calculation unit 21 calculates, by Formula (39), a value $\zeta_{A,i2}$ (hereinafter referred to as a second commission result) necessary for calculation of the common key from the second randomized public keys information by using the secret key $D_{A,2}$. The proxy calculation unit 21 sends the calculated first commission result $\zeta_{A,i1}$ and second commission result $\zeta_{A,i2}$ to the terminal device $1_1$.

$$\zeta_{A,i1} = e(D_{A,1}, g_2^{-r_{i1}}) e(D_{A,1}, g_2^{r_{i1}} P_{i,B}{}^{s_{i1}}) \quad (38)$$

$$\zeta_{A,i2} = e(D_{A,1}, g_2^{-r_{i2}}) e(D_{A,1}, g_2^{r_{i2}} P_{i,B}{}^{s_{i2}}) \quad (39)$$

Likewise, the proxy calculation unit 21 of the key device $2_2$ calculates, by Formula (40), a value $\zeta_{B,i1}$ (hereinafter referred to as a first commission result) necessary for calculation of the common key from the first randomized public keys information by using the secret key $D_{B,2}$. Moreover, the proxy calculation unit 21 calculates, by Formula (41), a value $\zeta_{B,i2}$ (hereinafter referred to as a second commission result) necessary for calculation of the common key from the second randomized public keys information by using the secret key $D_{B,2}$. The proxy calculation unit 21 sends the calculated first commission result $\zeta_{B,i1}$ and second commission result $\zeta_{B,i2}$ to the terminal device $1_2$.

$$\zeta_{B,i1} = e(g_1^{-1_{i1}}, D_{B,2}) e(g_1^{1_{i1}} P_{i,A}{}^{t_{i1}}, D_{B,2}) \quad (40)$$

$$\zeta_{B,i2} = e(g_1^{-1_{i2}}, D_{B,2}) e(g_1^{1_{i2}} P_{i,A}{}^{t_{i2}}, D_{B,2}) \quad (41)$$

In Step S14, the verification unit 14 of the terminal device verifies, by Formula (42), whether or not a value (hereinafter referred to as a first verification value) obtained by raising the first commission result $\zeta_{A,i1}$ to the $s_{i12}$-th power and a value (hereinafter referred to as a second verification value) obtained by raising the second commission result $\zeta_{A,i2}$ to the $s_{i1}$-th power coincide with each other. Likewise, the verification unit 14 of the terminal device $1_2$ verifies, by Formula (43), whether or not a value (hereinafter referred to as a first verification value) obtained by raising the first commission result $\zeta_{B,i1}$ to the $t_{i2}$-th power and a value (hereinafter referred to as a second verification value) obtained by raising the second commission result $\zeta_{B,i2}$ to the $t_{i1}$-th power coincide with each other. If the first verification value and the second verification value coincide with each other, the processing proceeds to Step S151. If the first verification value and the second verification value do not coincide with each other, the processing is returned to Step S122.

$$\zeta_{A,i1}{}^{s_{i2}} = \zeta_{A,i2}{}^{s_{i1}} \quad (42)$$

$$\zeta_{B,i1}{}^{t_{i2}} = \zeta_{B,i2}{}^{t_{i1}} \quad (43)$$

In Step S151, the common key calculation unit 15 of the terminal device $1_1$ calculates, by Formula (44), a commission result from the first commission result $\zeta_{A,i1}$ and the second commission result $\zeta_{A,i2}$ by using the random numbers $s'_{i1}$ and $s'_{i2}$. Likewise, the common key calculation unit 15 of the terminal device $1_2$ calculates, by Formula (45), a commission result $\zeta_{B,i}$ from the first commission result $\zeta_{B,i1}$ and the second commission result $\zeta_{B,i2}$ by using the random numbers $t'_{i1}$ and $t'_{i2}$.

$$\zeta_{A,i} = \zeta_{A,i1}{}^{s'_{i1}} \zeta_{A,i2}{}^{s'_{i2}} = e(D_{A,1}, P_{i,B}) \quad (44)$$

$$\zeta_{B,i} = \zeta_{B,i1}{}^{t'_{i1}} \zeta_{B,i2}{}^{t'_{i2}} = e(P_{i,A}, D_{B,2}) \quad (45)$$

In Step S152, the common key calculation unit 15 of the terminal device $1_1$ generates values $\sigma_1, \ldots, \sigma_m$ by calculating a value $\sigma_i$ for $i=1, \ldots, m$ by Formula (46). Likewise, the common key calculation unit 15 of the terminal device $1_2$ generates values $\sigma_1, \ldots, \sigma_m$ by calculating a value $\sigma_i$ for $i=1, \ldots, m$ by Formula (47).

$$\sigma_i = e(D_{A,1}^{c_{i,0,0}} Z_1^{c_{i,1,0} x_A}, Q_{B,2}) e(D_{A,1}^{c_{i,0,1}} Z_1^{c_{i,1,1} x_A}, X_{B,2}) \quad (46)$$
$$= \zeta_{A,i} e(Z_1^{x_A}, Q_{B,2}^{c_{i,1,0}} X_{B,2}^{c_{i,1,1}})$$

$$\sigma_i = e(Q_{A,1}, D_{B,2}^{c_{i,0,0}} Z_2^{c_{i,0,1} x_B}) e(X_{A,1}, D_{B,2}^{c_{i,1,0}} Z_2^{c_{i,1,1} x_B}) \quad (47)$$
$$= \zeta_{B,i} e(Q_{A,1}^{c_{i,0,1}} X_{A,1}^{c_{i,1,1}}, Z_2^{x_B})$$

In Step S153, the common key calculation unit 15 of the terminal device $1_1$ calculates values $\sigma_{m+1}$ and $\sigma_{m+2}$ by Formula (48). Likewise, the common key calculation unit 15 of the terminal device $1_2$ calculates values $\sigma_{m+1}$ and $\sigma_{m+2}$ by Formula (49).

$$\sigma_{m+1} = X_{B,2}{}^{x_A}, \sigma_{m+2} = X_{B,2}{}^{x_A} \quad (48)$$

$$\sigma_{m+1} = X_{A,1}{}^{x_B}, \sigma_{m+2} = X_{A,2}{}^{x_B} \quad (49)$$

In Step S154, the common key calculation units 15 of the terminal device $1_1$ and the terminal device $1_2$ calculate a common key K by using the values $\sigma_1, \ldots, \sigma_{m+2}$ by using Formula (50).

$$K = H(\sigma_1, \ldots, \sigma_{m+2}, ID_A, ID_B, X_{A,1}, X_{A,2}, X_{B,1}, X_{B,2}) \quad (50)$$

All of the values $\sigma_1, \ldots, \sigma_{m+2}$ calculated by the common key calculation units 15 of the terminal device $1_1$ and the terminal device $1_2$ can be expressed as in Formula (51) on the assumption that $i=1, \ldots, m$. Therefore, the common key K calculated by the terminal device $1_1$ and the common key K calculated by the terminal device $1_2$ coincide with each other.

$$\sigma_i = g_T^{zp_i(Q_{A,1}, Q_{B,2}, x_A, x_B)},$$

$$\sigma_{m+1} = g_1^{x_A x_B},$$

$$\sigma_{m+2} = g_2^{x_A x_B} \quad (51)$$

[Modification 5-1]

Modification 5-1 is a modification of the id-id AKE method using self-correction of the fifth embodiment. The present modification is a configuration in which, in particular, in a configuration in which the key device holds a secret key and the key device generates a short-term secret key, the key device is commissioned to calculate a power of the group $G_T$.

Hereinafter, a processing procedure of a key exchange method of the present modification will be described. In the following description, a difference from the above-described fifth embodiment will be mainly explained.

In the present modification, key generation is performed in the following manner. The key generating device 3 randomly selects a master secret key $z \in Z_q$, and calculates a pair of master public keys $(Z_1 = g_1^z \in G_1, Z_2 = g_2^z \in G_2)$ and makes the pair $(Z_1 = g_1^z \in G_1, Z_2 = g_2^z \in G_2)$ public. The terminal device $1_1$ calculates a pair of public keys $(Q_{A,1} = H_1(ID_A) \in G_1, Q_{A,2} = H_2(ID_A) \in G_2)$ by using an identifier $ID_A$ and makes the pair $(Q_{A,1} = H_1(ID_A) \in G_1, Q_{A,2} = H_2(ID_A) \in G_2)$ public. Likewise, the terminal device $1_2$ calculates a pair of public keys $(Q_{B,1} = H_1(ID_B) \in G_1, Q_{B,2} = H_2(ID_B) \in G_2)$ by using an identifier $ID_B$ and makes the pair $(Q_{B,1} = H_1(ID_B) \in G_1, Q_{B,2} = H_2(ID_B) \in G_2)$ public. The key generating device 3 calculates two pairs of secret keys $(D_{A,1} = Q_{A,1}^z, D_{A,2} = Q_{A,2}^z)$ and $(D_{B,1} = Q_{B,1}^z, D_{B,2} = Q_{B,2}^z)$ by using the two pairs of public keys $(Q_{A,1}, Q_{A,2})$ and $(Q_{B,1}, Q_{B,2})$ and distributes the pair of secret keys $(D_{A,1}, D_{A,2})$ to the key device $2_1$ and the pair of secret keys $(D_{B,1}, D_{B,2})$ to the key device $2_2$. The key device $2_1$ randomly selects a short-term secret key $z_A \in Z_q$, generates a pair of short-term public keys $(X_{A,1} = g_1^{x_A}, X_{A,2} = g_2^{x_A})$, and sends the pair $(X_{A,1} = g_1^{x_A}, X_{A,2} = g_2^{x_A})$ to the terminal device $1_1$. Likewise, the key device $2_2$ randomly selects a short-term secret key $z_B \in Z_q$, generates a pair of short-term public keys $(X_{B,1} = g_1^{x_B}, X_{B,2} = g_2^{x_B})$, and sends the pair $(X_{B,1} = g_1^{x_B}, X_{B,2} = g_2^{x_B})$ to the terminal device $1_2$.

In the present modification, after the processing in Steps S121, S122, S13, S21, S14, and S151 is repeatedly performed m times, processing in the following Steps S121b, S122b, S13b, S21b, S14b, and S151b (not depicted in the drawing) is repeatedly performed m+2 times. In the following description, a processing procedure in the i (=1, . . . , m+2)-th repetition of the processing will be described.

In Step S121b, the random number generating unit 12 of the terminal device $1_1$ performs calculation of Formula (52). Likewise, the random number generating unit 12 of the terminal device $1_2$ performs calculation of Formula (53).

$$g_T^{x_B} = e(g_1, g_2^{x_B}) = e(g_1, X_{B,2}) \quad (52)$$

$$g_T^{x_A} = e(g_1^{x_A}, g_2) = e(X_{A,1}, g_2) \quad (53)$$

In Step S122b, the random number generating unit 12 of the terminal device $1_1$ generates random numbers $s_{i21}, s_{i22}, s'_{i21}, s'_{i22}, r_{i21}$, and $r_{i22}$. Here, $s_{i21}$ and $s_{i22}$ are assumed to be mutually prime and satisfy $s_{i21} s'_{i21} + s_{i22} s'_{i22} = 1$. An assumption is made that $r_{i21}$ and $r_{i22}$ are arbitrary nonzero integers. Likewise, the random number generating unit 12 of the terminal device $1_2$ generates random numbers $t_{i21}, t_{i22}, t'_{i21}, t'_{i22}, 1_{i21}$, and $1_{i22}$. Here, $t_{i21}$ and $t_{i22}$ are assumed to be mutually prime and satisfy $t_{i21} t'_{i21} + t_{i22} t'_{i22} = 1$. An assumption is made that $1_{i21}$ and $1_{i22}$ are arbitrary nonzero integers.

In Step S13b, the public keys randomizing unit 13 of the terminal device $1_1$ calculates, by Formula (54), values (hereinafter referred to as first randomized public keys information) obtained by randomizing the public key $Q_{B,2}$ and the short-term public key $X_{B,2}$ of the terminal device $1_2$ by using the random numbers $s_{i21}$ and $r_{i21}$. Moreover, the public keys randomizing unit 13 calculates, by Formula (55), values (hereinafter referred to as second randomized public keys information) obtained by randomizing the public key $Q_{B,2}$ and the short-term public key $X_{B,2}$ of the terminal device $1_2$ by using the random numbers $s_{i22}$ and $r_{i22}$. The public keys randomizing unit 13 sends a pair of the calculated first randomized public keys information and second randomized public keys information to the key device $2_1$.

$$(h_i^{-r_{i21}}, h_i^{r_{i21}} \alpha_{i,B}^{s_{i21}}) \quad (54)$$

$$(h_i^{-r_{i22}}, h_i^{r_{i22}} \alpha_{i,B}^{s_{i22}}) \quad (55)$$

where $$\alpha_{i,B} = \begin{cases} e(Z_1, Q_{B,2}^{c_{i,1,0}} X_{B,2}^{c_{i,1,1}}), & i = 1, \ldots, m, \\ X_{B,1}, & i = m+1, \\ X_{B,2}, & i = m+2. \end{cases}$$

$$h_i = \begin{cases} g_T, & i = 1, \ldots, m, \\ g_1, & i = m+1, \\ g_2, & i = m+2. \end{cases}$$

Likewise, the public keys randomizing unit 13 of the terminal device $1_2$ calculates, by Formula (56), values (hereinafter referred to as first randomized public keys information) obtained by randomizing the public key $Q_{A,1}$ and the short-term public key $X_{A,1}$ of the terminal device $1_1$ by using the random numbers $t_{i21}$ and $1_{i21}$. Moreover, the public keys randomizing unit 13 calculates, by Formula (57), values (hereinafter referred to as second randomized public keys information) obtained by randomizing the public key $Q_{A,1}$ and the short-term public key $X_{A,1}$ of the terminal device $1_1$ by using the random numbers $t_{i22}$ and $1_{i22}$. The public keys randomizing unit 13 sends a pair of the calculated first randomized public keys information and second randomized public keys information to the key device $2_2$.

$$(h_i^{-1_{i21}}, h_i^{1_{i21}} \alpha_{i,A}^{t_{i21}}) \quad (56)$$

$$(h_i^{-1_{i22}}, h_i^{1_{i22}} \alpha_{i,A}^{t_{i22}}) \quad (57)$$

where $$\alpha_{i,A} = \begin{cases} e(Q_{A,1}^{c_{i,0,1}} X_{A,1}^{c_{i,1,1}}, Z_2), & i = 1, \ldots, m, \\ X_{A,1}, & i = m+1, \\ X_{A,2}, & i = m+2. \end{cases}$$

$$h_i = \begin{cases} g_T, & i = 1, \ldots, m, \\ g_1, & i = m+1, \\ g_2, & i = m+2. \end{cases}$$

In Step S21b, the proxy calculation unit 21 of the key device $2_1$ calculates, by Formula (58), a value $\xi_{A,i1}$ (hereinafter referred to as a first commission result) necessary for calculation of a common key from the first randomized public keys information by using a short-term secret key $x_A$. Moreover, the proxy calculation unit 21 calculates, by Formula (59), a value $\xi_{A,i2}$ (hereinafter referred to as a second commission result) necessary for calculation of the common key from the second randomized public keys information by using the short-term secret key $x_A$. The proxy calculation unit 21 sends the calculated first commission result $\xi_{A,i1}$ and second commission result $\xi_{A,i2}$ to the terminal device $1_1$.

$$\xi_{A,i1} = h_i^{-r_{i21} x_A} (h_i^{r_{i21}} \alpha_{i,B}^{s_{i21}})^{x_A} \quad (58)$$

$$\xi_{A,i2} = h_i^{-r_{i22} x_A} (h_i^{r_{i22}} \alpha_{i,B}^{s_{i22}})^{x_A} \quad (59)$$

Likewise, the proxy calculation unit 21 of the key device $2_2$ calculates, by Formula (60), a value $\xi_{B,i1}$ (hereinafter referred to as a first commission result) necessary for calculation of the common key from the first randomized public keys information by using a short-term secret key $x_B$. Moreover, the proxy calculation unit 21 calculates, by Formula (61), a value $\xi_{B,i2}$ (hereinafter referred to as a second commission result) necessary for calculation of the common key from the second randomized public keys information by using the short-term secret key $x_{13}$. The proxy calculation unit 21 sends the calculated first commission result $\xi_{B,i1}$ and second commission result $\xi_{B,i2}$ to the terminal device $1_2$.

$$\xi_{B,i1} = h_i^{-1/21 \times B}(h_i^{1/21}\alpha_{i,A}^{t/21})^{xB} \qquad (60)$$

$$\xi_{B,i2} = h_i^{-1/22 \times B}(h_i^{1/22}\alpha_{i,A}^{t/22})^{xB} \qquad (61)$$

In Step S14b, the verification unit 14 of the terminal device $1_1$ verifies, by Formula (62), whether or not a value (hereinafter referred to as a first verification value) obtained by raising the first commission result $\xi_{A,i1}$ to the $s_{i22}$-th power and a value (hereinafter referred to as a second verification value) obtained by raising the second commission result $\xi_{A,i2}$ to the $s_{i21}$-th power coincide with each other. Likewise, the verification unit 14 of the terminal device $1_2$ verifies, by Formula (63), whether or not a value (hereinafter referred to as a first verification value) obtained by raising the first commission result $\xi_{B,i1}$ to the $t_{i22}$-th power and a value (hereinafter referred to as a second verification value) obtained by raising the second commission result $\xi_{B,i2}$ to the $t_{i21}$-th power coincide with each other. If the first verification value and the second verification value coincide with each other, the processing proceeds to Step S151b. If the first verification value and the second verification value do not coincide with each other, the processing is returned to Step S122b.

$$\xi_{A,i1}^{s i22} = \xi_{A,i2}^{s i21} \qquad (62)$$

$$\xi_{B,i1}^{t i22} = \xi_{B,i2}^{t i21} \qquad (63)$$

In Step S151b, the common key calculation unit 15 of the terminal device $1_1$ calculates, by Formula (64), a commission result $\xi_{A,i}$ from the first commission result $\xi_{A,i1}$ and the second commission result $\xi_{A,i2}$ by using the random numbers $s'_{i21}$ and $s'_{i22}$. Likewise, the common key calculation unit 15 of the terminal device $1_2$ calculates, by Formula (65), a commission result $\xi_{B,i}$ from the first commission result $\xi_{B,i1}$ and the second commission result $\xi_{B,i2}$ by using the random numbers $t'_{i21}$ and $t'_{i22}$.

$$\xi_{A,i} = \xi_{A,i1}^{s'i21}\xi_{A,i2}^{s'i22} = \alpha_{i,B}^{xA} \qquad (64)$$

$$\xi_{B,i} = \xi_{B,i1}^{t'i21}\xi_{B,i2}^{t'i22} = \alpha_{i,A}^{xB} \qquad (65)$$

In Step S152, the common key calculation unit 15 of the terminal device $1_1$ generates values $\sigma_1, \ldots, \sigma_m$ by calculating a value $\sigma_i$ for $i=1, \ldots, m$ by Formula (66). Likewise, the common key calculation unit 15 of the terminal device $1_2$ generates values $\sigma_1, \ldots, \sigma_m$ by calculating a value $\sigma_i$ for $i=1, \ldots, m$ by Formula (67).

$$\sigma_i = e(D_{A,1}^{c_{i,0,0}} Z_1^{c_{i,0,1} \times A}, Q_{B,2}) e(D_{A,1}^{c_{i,0,1}} Z_1^{c_{i,1,1} \times A}, X_{B,2}) \qquad (66)$$
$$= \varsigma_{A,i}\xi_{A,i}$$

$$\sigma_i = e(Q_{A,1}, D_{B,2}^{c_{i,0,0}} Z_2^{c_{i,0,1} \times B}) e(X_{A,1}, D_{B,2}^{c_{i,1,0}} Z_2^{c_{i,1,1} \times B}) \qquad (67)$$
$$= \varsigma_{B,i}\xi_{B,i}$$

In Step S153, the common key calculation unit 15 of the terminal device $1_1$ calculates values $\sigma_{m+1}$ and $\sigma_{m+2}$ by Formula (68). Likewise, the common key calculation unit 15 of the terminal device $1_2$ calculates values $\sigma_{m+1}$ and $\sigma_{m+2}$ by Formula (69).

$$\sigma_{m+1} = X_{B,1}^{xA}, \sigma_{m+2} = X_{B,2}^{xA} \qquad (68)$$

$$\sigma_{m+1} = X_{A,1}^{xB}, \sigma_{m+2} = X_{A,2}^{xB} \qquad (69)$$

In Step S154, the common key calculation unit 15 of the terminal device $1_1$ and the common key calculation unit 15 of the terminal device $1_2$ calculate a common key K by using the values $\sigma_1, \ldots, \sigma_{m+2}$ by Formula (70).

$$K = H(\sigma_1, \ldots, \sigma_{m+2}, ID_A, ID_B, X_{A,1}, X_{A,2}, X_{B,1}, X_{B,2}) \qquad (70)$$

[Modification 5-2]

Modification 5-2 is a modification of the id-id AKE method using self-correction of the fifth embodiment. The present modification is a configuration in which, in particular, in a configuration in which the key device holds a secret key and the key device generates a short-term secret key, the key device is commissioned to calculate pairing of the group $G_T$.

Hereinafter, a processing procedure of a key exchange method of the present modification will be described. In the following description, a difference from the above-described fifth embodiment will be mainly explained.

In the present modification, key generation is performed in a manner similar to Modification 5-1.

In the present modification, after the processing in Steps S121, S122, S13, S21, S14, and S151 is repeatedly performed m times, processing in the following Steps S121c, S122c, S13c, S21c, S14c, and S151c (not depicted in the drawing) is repeatedly performed m times. In the following description, a processing procedure in the i (=1, . . . , m)-th repetition of the processing will be described. Then, the above-described processing in Steps S121b, S122b, S13b, S21b, S14b, and S151b is performed on i=m+1 and m+2.

In Step S121c, the random number generating unit 12 of the terminal device $1_1$ performs calculation of Formula (71). Likewise, the random number generating unit 12 of the terminal device $1_2$ performs calculation of Formula (72).

$$e(Z_1^{xA}, g_2) = e(g_1^{zxA}, g_2) \qquad (71)$$
$$= e(g_1^{xA}, g_2^z)$$
$$= e(X_{A,1}, Z_2)$$

$$e(g_1, Z_2^{xB}) = e(g_1, g_2^{zxB}) \qquad (72)$$
$$= e(g_1^z, g_2^{xA})$$
$$= e(Z_1, X_{B,2})$$

In Step S122c, the random number generating unit 12 of the terminal device $1_1$ generates random numbers $s_{i31}$, $s_{i32}$, $s'_{i31}$, $s'_{i32}$, $r_{i31}$, and $r_{i32}$. Here, $s_{i31}$ and $s_{i32}$ are assumed to be mutually prime and satisfy $s_{i31}s'_{i31} + s_{i32}s'_{i32} = 1$. An assumption is made that $r_{i31}$ and $r_{i32}$ are arbitrary nonzero integers. Likewise, the random number generating unit 12 of the terminal device $1_2$ generates random numbers $t_{i31}$, $t_{i32}$, $t'_{i31}$, $t'_{i32}$, $1_{i31}$, and $1_{i32}$. Here, $t_{i31}$ and $t_{i32}$ are assumed to be mutually prime and satisfy $t_{i31}t'_{i31}+t_{i32}t'_{i32}=1$. An assumption is made that $\mathbf{1}_{i31}$ and $\mathbf{1}_{i32}$ are arbitrary nonzero integers.

In Step S13c, the public keys randomizing unit 13 of the terminal device $\mathbf{1}_1$ calculates, by Formula (73), values (hereinafter referred to as first randomized public keys information) obtained by randomizing the public key $Q_{B,2}$ and the short-term public key $X_{B,2}$ of the terminal device $\mathbf{1}_2$ by using the random numbers $s_{i31}$ and $r_{i31}$. Moreover, the public keys randomizing unit 13 calculates, by Formula (74), values (hereinafter referred to as second randomized public keys information) obtained by randomizing the public key $Q_{B,2}$ and the short-term public key $X_{B,2}$ of the terminal device $\mathbf{1}_2$ by using the random numbers $s_{i32}$ and $r_{i32}$. The public keys randomizing unit 13 sends a pair of the calculated first randomized public keys information and second randomized public keys information to the key device $\mathbf{2}_1$.

$$(g_2^{-r_{i31}}, g_2^{r_{i31}} P'_{i,B}{}^{s_{i31}}) \quad (73)$$

$$(g_2^{-r_{i32}}, g_2^{r_{i32}} P'_{i,B}{}^{s_{i32}}) \quad (74)$$

where
$P'_{i,B} = Q_{B,2}{}^{c_{i,1,0}} X_{B,2}{}^{c_{i,1,1}}$

Likewise, the public keys randomizing unit 13 of the terminal device $\mathbf{1}_2$ calculates, by Formula (75), values (hereinafter referred to as first randomized public keys information) obtained by randomizing the public key $Q_{A,1}$ and the short-term public key $X_{A,1}$ of the terminal device by using the random numbers $t_{i31}$ and $\mathbf{1}_{i31}$. Moreover, the public keys randomizing unit 13 calculates, by Formula (76), values (hereinafter referred to as second randomized public keys information) obtained by randomizing the public key $Q_{A,1}$ and the short-term public key $X_{A,1}$ of the terminal device $\mathbf{1}_1$ by using the random numbers $t_{i32}$ and $\mathbf{1}_{i32}$. The public keys randomizing unit 13 sends a pair of the calculated first randomized public keys information and second randomized public keys information to the key device $\mathbf{2}_2$.

$$(g_1^{-1_{i31}}, g_1^{1_{i31}} P'_{i,B}{}^{t_{i31}}) \quad (75)$$

$$(g_1^{-1_{i32}}, g_1^{1_{i32}} P'_{i,B}{}^{t_{i32}}) \quad (76)$$

where
$P'_{i,B} = Q_{A,1}{}^{c_{i,0,1}} X_{A,1}{}^{c_{i,1,1}}$

In Step S21c, the proxy calculation unit 21 of the key device $\mathbf{2}_1$ calculates, by Formula (77), a value $\xi_{A,i1}$ (hereinafter referred to as a first commission result) necessary for calculation of a common key from the first randomized public keys information by using a short-term secret key $x_A$. Moreover, the proxy calculation unit 21 calculates, by Formula (78), a value $\xi_{A,i2}$ (hereinafter referred to as a second commission result) necessary for calculation of the common key from the second randomized public keys information by using the short-term secret key $x_A$. The proxy calculation unit 21 sends the calculated first commission result $\xi_{A,i1}$ and second commission result $\xi_{A,i2}$ to the terminal device $\mathbf{1}_1$.

$$\xi_{A,i1} = e(Z_1^{x_A}, g_2^{-r_{i31}}) e(Z_1^{x_A}, g_2^{r_{i31}} P'_{i,B}{}^{s_{i31}}) \quad (77)$$

$$\xi_{A,i2} = e(Z_1^{x_A}, g_2^{-r_{i32}}) e(Z_1^{x_A}, g_2^{r_{i32}} P'_{i,B}{}^{s_{i32}}) \quad (78)$$

Likewise, the proxy calculation unit 21 of the key device $\mathbf{2}_2$ calculates, by Formula (79), a value $\xi_{B,i1}$ (hereinafter referred to as a first commission result) necessary for calculation of the common key from the first randomized public keys information by using a short-term secret key $x_B$. Moreover, the proxy calculation unit 21 calculates, by Formula (80), a value $\xi_{B,i2}$ (hereinafter referred to as a second commission result) necessary for calculation of the common key from the second randomized public keys information by using the short-term secret key $x_B$. The proxy calculation unit 21 sends the calculated first commission result $\xi_{B,i1}$ and second commission result $\xi_{B,i2}$ to the terminal device $\mathbf{1}_2$.

$$\xi_{B,i1} = e(g_1^{-1_{i31}}, Z_2^{x_B}) e(g_1^{1_{i31}} P'_{i,B}{}^{t_{i31}}, Z_2^{x_B}) \quad (79)$$

$$\xi_{B,i2} = e(g_1^{-1_{i32}}, Z_2^{x_B}) e(g_1^{1_{i32}} P'_{i,B}{}^{t_{i32}}, Z_2^{x_B}) \quad (80)$$

In Step S14c, the verification unit 14 of the terminal device $\mathbf{1}_1$ verifies, by Formula (81), whether or not a value (hereinafter referred to as a first verification value) obtained by raising the first commission result $\xi_{A,i1}$ to the $s_{i32}$-th power and a value (hereinafter referred to as a second verification value) obtained by raising the second commission result $\xi_{A,i2}$ to the $s_{i31}$-th power coincide with each other. Likewise, the verification unit 14 of the terminal device $\mathbf{1}_2$ verifies, by Formula (82), whether or not a value (hereinafter referred to as a first verification value) obtained by raising the first commission result $\xi_{B,i1}$ to the $t_{i32}$-th power and a value (hereinafter referred to as a second verification value) obtained by raising the second commission result $\xi_{B,i2}$ to the $t_{i31}$-th power coincide with each other. If the first verification value and the second verification value coincide with each other, the processing proceeds to Step S151c. If the first verification value and the second verification value do not coincide with each other, the processing is returned to Step S122c.

$$\xi_{A,i1}{}^{s_{i32}} = \xi_{A,i2}{}^{s_{i31}} \quad (81)$$

$$\xi_{B,i1}{}^{t_{i32}} = \xi_{B,i2}{}^{t_{i31}} \quad (82)$$

In Step S151c, the common key calculation unit 15 of the terminal device $\mathbf{1}_1$ calculates, by Formula (83), a commission result $\xi_{A,i}$ from the first commission result and the second commission result $\xi_{A,i2}$ by using the random numbers $s'_{i31}$ and $s'_{i32}$. Likewise, the common key calculation unit 15 of the terminal device $\mathbf{1}_2$ calculates, by Formula (84), a commission result $\xi_{B,i}$ from the first commission result $\xi_{B,i1}$ and the second commission result $\xi_{B,i2}$ by using the random numbers $t'_{i21}$ and $t'_{i22}$.

$$\xi_{A,i} = \xi_{A,i1}{}^{s'_{i31}} \xi_{A,i2}{}^{s'_{i32}} = e(Z_1^{x_A}, P'_{i,B}) \quad (83)$$

$$\xi_{B,i} = \xi_{B,i1}{}^{t'_{i31}} \xi_{B,i2}{}^{t'_{i32}} = e(P'_{i,B}, Z_2^{x_B}) \quad (84)$$

Sixth Embodiment

A sixth embodiment is a cert-cert AKE method using self-correction. The present embodiment is, in particular, a configuration in which the key device holds a secret key and the terminal device generates a short-term secret key.

Figure 9:
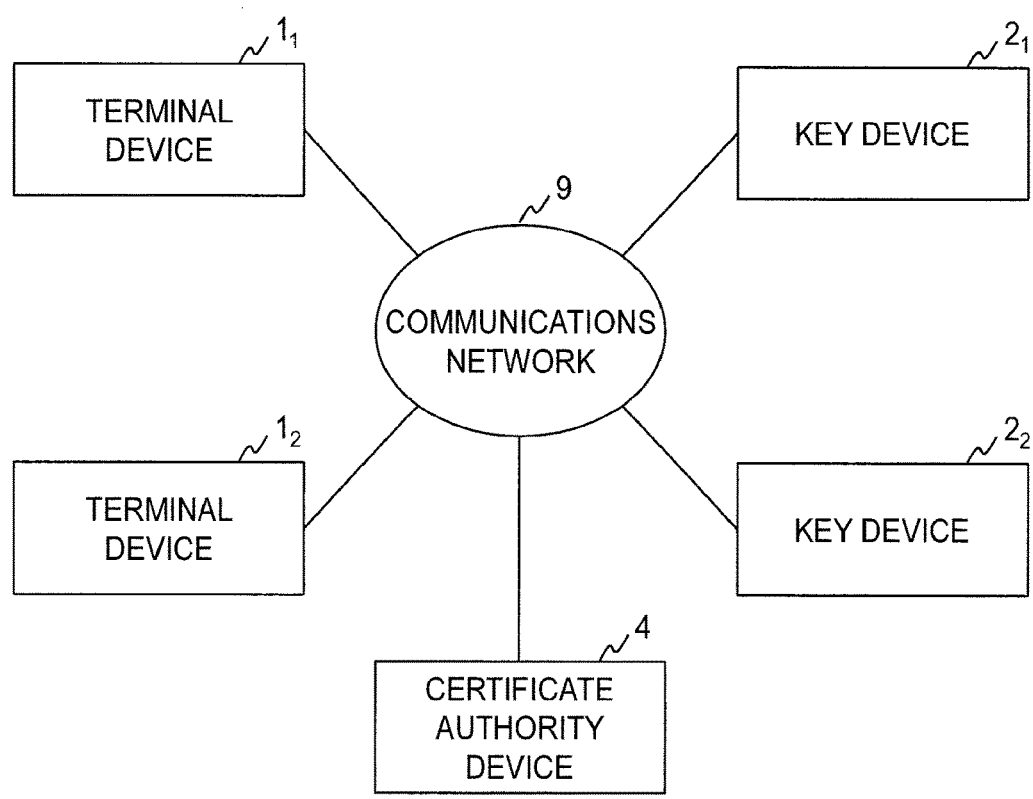
FIG. 9 is a diagram illustrating the functional configuration of a key exchange system of a sixth embodiment.

In addition to the terminal devices $\mathbf{1}_1$ and $\mathbf{1}_2$ and the key devices $\mathbf{2}_1$ and $\mathbf{2}_2$, as depicted in FIG. 9, for example, a key exchange system of the present embodiment includes a certificate authority device 4.

Figure 10:
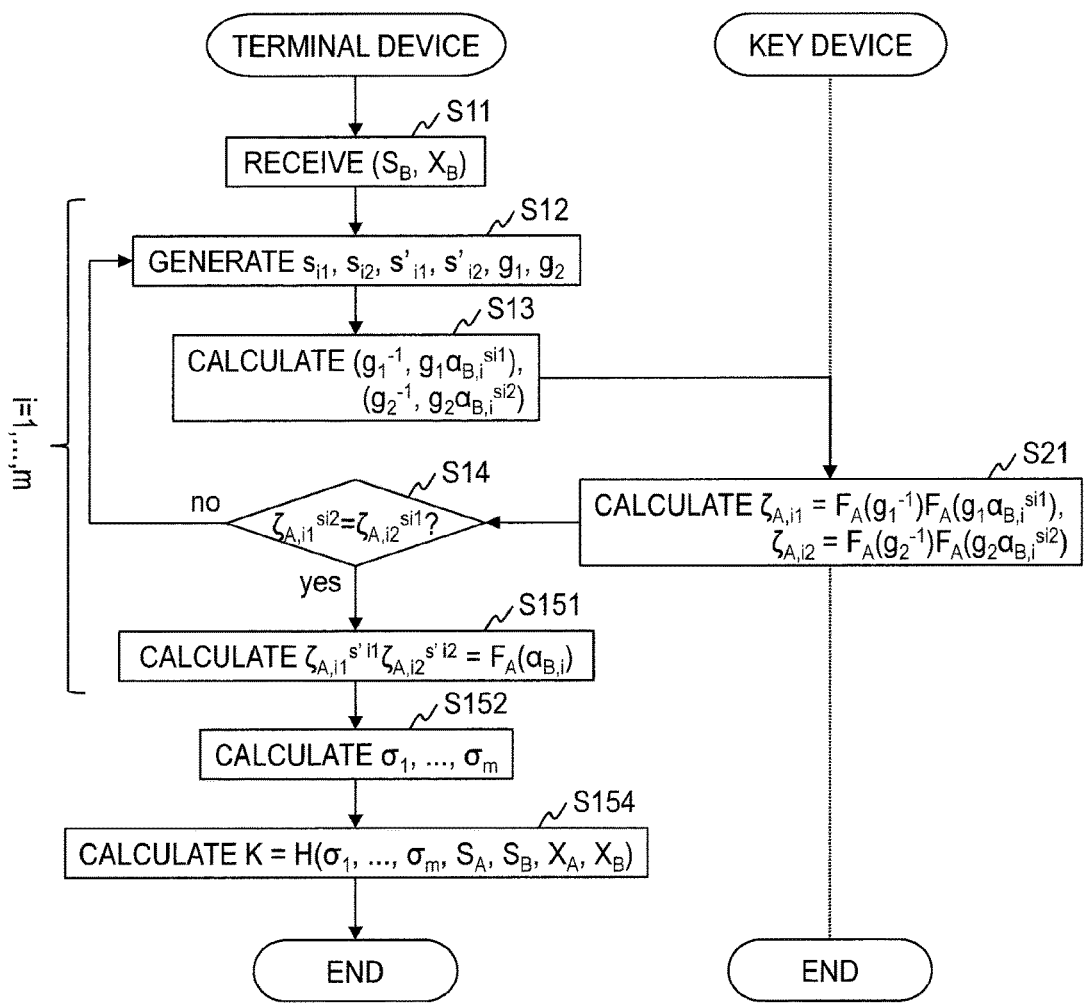
FIG. 10 is a diagram illustrating a processing flow of a key exchange method of the sixth embodiment.

Hereinafter, with reference to FIG. 10, a processing procedure of a key exchange method of the present embodiment will be described. In the following description, a difference from the above-described fifth embodiment will be mainly explained.

In the present embodiment, key generation is performed in the following manner. The key device $\mathbf{2}_1$ randomly selects a secret key $s_A \in Z_q$, calculates a public key $S_A = g^{s_A} \in G$, and sends the public key $S_A$ to the terminal device $\mathbf{1}_1$. Likewise, the key device $\mathbf{2}_2$ randomly selects a secret key $s_B \in Z_q$, calculates a public key $S_B = g^{s_B} \in G$, and sends the public key $S_B$ to the terminal device $\mathbf{1}_2$. The certificate authority device 4 authenticates the public key $S_A$ of the terminal device $\mathbf{1}_1$ and the public key $S_B$ of the terminal device $1_2$. The terminal device $1_1$ randomly selects a short-term secret key $x_A \in Z_q$ and calculates a short-term public key $X_A = g^{x_A} \in G$. Likewise, the terminal device $1_2$ randomly selects a short-term secret key $x_B \in Z_q$ and calculates a short-term public key $X_B = g^{x_B} \in G$.

In Step S11, the public key receiving unit 11 of the terminal device $1_1$ sends information $(S_A, X_A)$ formed of the public key and the short-term public key to the terminal device $1_2$. The public key receiving unit 11 of the terminal device $1_2$ receives the information $(S_A, X_A)$ from the terminal device $1_1$. Likewise, the public key receiving unit 11 of the terminal device $1_2$ sends information $(S_B, X_B)$ formed of the public key and the short-term public key to the terminal device $1_1$. The public key receiving unit 11 of the terminal device $1_1$ receives the information $(S_B, X_B)$ from the terminal device $1_2$.

In the present embodiment, processing in Steps S12, S13, S21, S14, and 151S is repeatedly performed m times. In the following description, a processing procedure in the i (=1, . . . , m)-th repetition of the processing will be described.

In Step S12, the random number generating unit 12 of the terminal device $1_1$ generates random numbers $s_{i1}, s_{i2}, s'_{i1}, s'_{i2} \in Z$ and group elements $g_1, g_2 \in G$. Here, $s_{i1}$ and $s_{i2}$ are assumed to be mutually prime and satisfy $s_{i1}s'_{i1} + s_{i2}s'_{i2} = 1$. An assumption is made that $g_1$ and $g_2$ are elements which are not unit elements of the group G. Likewise, the random number generating unit 12 of the terminal device $1_2$ generates random numbers $t_{i1}, t_{i2}, t'_{i1}, t'_{i2} \in Z$ and group elements $g_3, g_4 \in G$. Here, $t_{i1}$ and $t_{i2}$ are assumed to be mutually prime and satisfy $t_{i1}t'_{i1} + t_{i2}t'_{i2} = 1$. An assumption is made that $g_3$ and $g_4$ are elements which are not unit elements of the group G.

In Step S13, the public keys randomizing unit 13 of the terminal device $1_1$ calculates, by Formula (85), values (hereinafter referred to as first randomized public keys information) obtained by randomizing the public key $S_B$ and the short-term public key $X_B$ of the terminal device $1_2$ by using the random number $s_{i1}$. Moreover, the public keys randomizing unit 13 calculates, by Formula (86), values (hereinafter referred to as second randomized public keys information) obtained by randomizing the public key $S_B$ and the short-term public key $X_B$ of the terminal device $1_2$ by using the random number $s_{i1}$. The public keys randomizing unit 13 sends a pair of the calculated first randomized public keys information and second randomized public keys information to the key device $2_1$.

$$(g_1^{-1}, g_1 \alpha_{B,i}^{s_{i1}}) \tag{85}$$

$$(g_2^{-1}, g_2 \alpha_{B,i}^{s_{i2}}) \tag{86}$$

where
$\alpha_{B,i} = X_B^{c_{i,0,0}} S_B^{c_{i,0,1}}$

Likewise, the public keys randomizing unit 13 of the terminal device $1_2$ calculates, by Formula (87), values (hereinafter referred to as first randomized public keys information) obtained by randomizing the public key $S_A$ and the short-term public key $X_A$ of the terminal device $1_1$ by using the random number $t_{i1}$. Moreover, the public keys randomizing unit 13 calculates, by Formula (88), values (hereinafter referred to as second randomized public keys information) obtained by randomizing the public key $S_A$ and the short-term public key $X_A$ of the terminal device $1_1$ by using the random number $t_{i2}$. The public keys randomizing unit 13 sends a pair of the calculated first randomized public keys information and second randomized public keys information to the key device $2_2$.

$$(g_3^{-1}, g_3 \alpha_{A,i}^{t_{i1}}) \tag{87}$$

$$(g_4^{-1}, g_4 \alpha_{A,i}^{t_{i2}}) \tag{88}$$

where
$\alpha_{A,i} = X_A^{c_{i,0,0}} S_A^{c_{i,1,0}}$

In Step S21, the proxy calculation unit 21 of the key device $2_1$ calculates, by Formula (89), a value $\zeta_{A,i1}$ (hereinafter referred to as a first commission result) necessary for calculation of a common key for a homomorphism $F_A$: $G \to G$, $h \to h^{x_A}$. Moreover, the proxy calculation unit 21 calculates, by Formula (90), a value $\zeta_{A,i2}$ (hereinafter referred to as a second commission result) necessary for calculation of the common key. The proxy calculation unit 21 sends the calculated first commission result $\zeta_{A,i1}$ and second commission result $\zeta_{A,i2}$ to the terminal device $1_1$.

$$\zeta_{A,i1} = F_A(g_1^{-1}) F_A(g_1 \alpha_{B,i}^{s_{i1}}) \tag{89}$$

$$\zeta_{A,i2} = F_A(g_2^{-1}) F_A(g_2 \alpha_{B,i}^{s_{i2}}) \tag{90}$$

Likewise, the proxy calculation unit 21 of the key device $2_2$ calculates, by Formula (91), a value $\zeta_{B,i1}$ (hereinafter referred to as a first commission result) necessary for calculation of the common key for a homomorphism $F_B$: $G \to G$, $h \to h^{x_B}$. Moreover, the proxy calculation unit 21 calculates, by Formula (92), a value $\zeta_{B,i2}$ (hereinafter referred to as a second commission result) necessary for calculation of the common key. The proxy calculation unit 21 sends the calculated first commission result $\zeta_{B,i1}$ and second commission result $\zeta_{B,i2}$ to the terminal device $1_2$.

$$\zeta_{B,i1} = F_B(g_3^{-1}) F_B(g_3 \alpha_{A,i}^{s_{i1}}) \tag{91}$$

$$\zeta_{B,i2} = F_B(g_4^{-1}) F_B(g_4 \alpha_{A,i}^{s_{i2}}) \tag{92}$$

In Step S14, the verification unit 14 of the terminal device verifies, by Formula (93), whether or not a value (hereinafter referred to as a first verification value) obtained by raising the first commission result $\zeta_{A,i1}$ to the $s_{i2}$-th power and a value (hereinafter referred to as a second verification value) obtained by raising the second commission result $\zeta_{A,i2}$ to the $s_{i1}$-th power coincide with each other. Likewise, the verification unit 14 of the terminal device $1_2$ verifies, by Formula (94), whether or not a value (hereinafter referred to as a first verification value) obtained by raising the first commission result $\zeta_{B,i1}$ to the $t_{i2}$-th power and a value (hereinafter referred to as a second verification value) obtained by raising the second commission result $\zeta_{B,i2}$ to the $t_{i1}$-th power coincide with each other. If the first verification value and the second verification value coincide with each other, the processing proceeds to Step S151. If the first verification value and the second verification value do not coincide with each other, the processing is returned to Step S12.

$$\zeta_{A,i1}^{s_{i2}} = \zeta_{A,i2}^{s_{i1}} \tag{93}$$

$$\zeta_{B,i1}^{t_{i2}} = \zeta_{B,i2}^{t_{i1}} \tag{94}$$

In Step S151, the common key calculation unit 15 of the terminal device $1_1$ calculates, by Formula (95), a commission result $\zeta_{A,i}$ from the first commission result $\zeta_{A,i1}$ and the second commission result $\zeta_{A,i2}$ by using the random numbers $s'_{i1}$ and $s'_{i2}$. Likewise, the common key calculation unit 15 of the terminal device $1_2$ calculates, by Formula (96), a commission result $\zeta_{B,i}$ from the first commission result $\zeta_{B,i1}$ and the second commission result $\zeta_{B,i2}$ by using the random numbers $t'_{i1}$ and $t'_{i2}$.

$$\zeta_{A,i} = \zeta_{A,i1}^{s'_{i1}} \zeta_{A,i2}^{s'_{i2}} = F_A(\alpha_{B,i}^{s_{i1}s'_{i1}+s_{i2}s'_{i2}}) = F_A(\alpha_{B,i}) \tag{95}$$

$$\zeta_{B,i} = \zeta_{B,i1}^{t'_{i1}} \zeta_{B,i2}^{t'_{i2}} = F_B(\alpha_{A,i}^{t_{i1}t'_{i1}+t_{i2}t'_{i2}}) = F_B(\alpha_{A,i}) \tag{96}$$

In Step S152, the common key calculation unit 15 of the terminal device $\mathbf{1}_1$ generates values $\sigma_1, \ldots, \sigma_m$ by calculating a value $\sigma_i$ for $i=1, \ldots, m$ by Formula (97). Likewise, the common key calculation unit 15 of the terminal device $\mathbf{1}_2$ generates values $\sigma_1, \ldots, \sigma_m$ by calculating a value $\sigma_i$ for $i=1, \ldots, m$ by Formula (98).

$$\sigma_i = X_B^{c_{i,0,0}s_A + c_{i,1,0}x_A} S_B^{c_{i,0,1}s_A + c_{i,1,1}x_A} \tag{97}$$
$$= F_A(\alpha_{B,i}) X_B^{c_{i,1,0}x_A} S_B^{c_{i,1,1}x_A}$$

$$\sigma_i = X_A^{c_{i,0,0}s_B + c_{i,0,1}x_B} S_A^{c_{i,0,1}s_B + c_{i,1,1}x_B} \tag{98}$$
$$= F_B(\alpha_{A,i}) X_A^{c_{i,0,1}x_B} S_A^{c_{i,1,1}x_B}$$

In Step S154, the common key calculation units 15 of the terminal device $\mathbf{1}_1$ and the terminal device $\mathbf{1}_2$ calculate a common key K by using the values $\sigma_1, \ldots, \sigma_m$ by Formula (99).

$$K = H(\sigma_1, \ldots, \sigma_m, S_A, S_B, X_A, X_B) \tag{99}$$

All of the values $\sigma_1, \ldots, \sigma_n$, calculated by the common key calculation units 15 of the terminal device $\mathbf{1}_1$ and the terminal device $\mathbf{1}_2$ can be expressed as in Formula (100) on the assumption that $i=1, \ldots, m$. Therefore, the common key K calculated by the terminal device $\mathbf{1}_1$ and the common key K calculated by the terminal device $\mathbf{1}_2$ coincide with each other.

$$\sigma_i = g^{p_i(s_A, s_B, x_A, x_B)} \tag{100}$$

[Modification 6]

Modification 6 is a modification of the cert-cert AKE method using self-correction of the sixth embodiment. The present modification is a configuration in which, in particular, in a configuration in which the key device holds a secret key and the key device generates a short-term secret key, the key device is commissioned to calculate a power of the group $G_T$.

Hereinafter, a processing procedure of a key exchange method of the present modification will be described. In the following description, a difference from the above-described sixth embodiment will be mainly explained.

In the present modification, key generation is performed in the following manner. The key device $\mathbf{2}_1$ randomly selects a secret key $s_A \in Z_q$, calculates a public key $S_A = g^{s_A} \in G$, and sends the public key $S_A$ to the terminal device $\mathbf{1}_1$. Likewise, the key device $\mathbf{2}_2$ randomly selects a secret key $s_B \in Z_q$, calculates a public key $S_B = g^{s_B} \in G$, and sends the public key $S_B$ to the terminal device $\mathbf{1}_2$. The certificate authority device 4 authenticates the public key $S_A$ of the terminal device $\mathbf{1}_1$ and the public key $S_B$ of the terminal device $\mathbf{1}_2$. The key device $\mathbf{2}_1$ randomly selects a short-term secret key $x_A \in Z_q$, calculates a short-term public key $X_A = g^{x_A} \in G$, and sends the short-term public key $X_A$ to the terminal device $\mathbf{1}_1$. Likewise, the key device $\mathbf{2}_2$ randomly selects a short-term secret key $x_B \in Z_q$, calculates a short-term public key $X_B = g^{x_B} \in G$, and sends the short-term public key $X_B$ to the terminal device $\mathbf{1}_2$.

In the present modification, after the processing in Steps S12, S13, S21, S14, and S151 is repeatedly performed m times, processing in the following Steps S12b, S13b, S21b, S14b, and S151b (not depicted in the drawing) is repeatedly performed m times. In the following description, a processing procedure in the i ($=1, \ldots, m$)-th repetition of the processing will be described.

In Step S12b, the random number generating unit 12 of the terminal device $\mathbf{1}_1$ generates random numbers $s_{i21}, s_{i22}$, $s'_{i21}, s'_{i22} \in Z$ and group elements $g_1, g_2 \in G$. Here, $s_{i21}$ and $s_{i22}$ are assumed to be mutually prime and satisfy $s_{i21}s'_{i21} + s_{i22}s'_{i22} = 1$. An assumption is made that $g_1$ and $g_2$ are elements which are not unit elements of the group G. Likewise, the random number generating unit 12 of the terminal device $\mathbf{1}_2$ generates random numbers $t_{i21}, t_{i22}, t'_{i21}, t'_{i22} \in Z$ and group elements $g_3, g_4 \in G$. Here, $t_{i21}$ and $t_{i22}$ are assumed to be mutually prime and satisfy $t_{i21}t'_{i21} + t_{i22}t'_{i22} = 1$. An assumption is made that $g_3$ and $g_4$ are elements which are not unit elements of the group G.

In Step S13b, the public keys randomizing unit 13 of the terminal device $\mathbf{1}_1$ calculates, by Formula (101), values (hereinafter referred to as first randomized public keys information) obtained by randomizing the public key $S_B$ and the short-term public key $X_B$ of the terminal device $\mathbf{1}_2$ by using the random number $s_{i21}$. Moreover, the public keys randomizing unit 13 calculates, by Formula (102), values (hereinafter referred to as second randomized public keys information) obtained by randomizing the public key $S_B$ and the short-term public key $X_B$ of the terminal device $\mathbf{1}_2$ by using the random number $s_{i22}$. The public keys randomizing unit 13 sends a pair of the calculated first randomized public keys information and second randomized public keys information to the key device $\mathbf{2}_1$.

$$(g_1^{-1}, g_1 \beta_{B,i}^{s_{i21}}) \tag{101}$$

$$(g_2^{-1}, g_2 \beta_{B,i}^{s_{i22}}) \tag{102}$$

where
$\beta_{B,i} = X_B^{c_{i,0,1}} S_B^{c_{i,1,1}}$

Likewise, the public keys randomizing unit 13 of the terminal device $\mathbf{1}_2$ calculates, by Formula (103), values (hereinafter referred to as first randomized public keys information) obtained by randomizing the public key $S_A$ and the short-term public key $X_A$ of the terminal device $\mathbf{1}_1$ by using the random number $t_{i21}$. Moreover, the public keys randomizing unit 13 calculates, by Formula (104), values (hereinafter referred to as second randomized public keys information) obtained by randomizing the public key $S_A$ and the short-term public key $X_A$ of the terminal device $\mathbf{1}_1$ by using the random number $t_{i22}$. The public keys randomizing unit 13 sends a pair of the calculated first randomized public keys information and second randomized public keys information to the key device $\mathbf{2}_2$.

$$(g_3^{-1}, g_3 \beta_{A,i}^{t_{i21}}) \tag{103}$$

$$(g_4^{-1}, g_4 \beta_{A,i}^{t_{i22}}) \tag{104}$$

where
$\beta_{A,i} = X_A^{c_{i,1,0}} S_A^{c_{i,1,1}}$

In Step S21b, the proxy calculation unit 21 of the key device $\mathbf{2}_1$ calculates, by Formula (105), a value $\xi_{A,i1}$ (hereinafter referred to as a first commission result) necessary for calculation of a common key for a homomorphism $F_{A,2}$: $G \to G$, $h \to h^{s_A}$. Moreover, the proxy calculation unit 21 calculates, by Formula (106), a value $\xi_{A,i2}$ (hereinafter referred to as a second commission result) necessary for calculation of the common key. The proxy calculation unit 21 sends the calculated first commission result $\xi_{A,i1}$ and second commission result $\xi_{A,i2}$ to the terminal device $\mathbf{1}_1$.

$$\xi_{A,i1} = F_{A,2}(g_1^{-1}) F_{A,2}(g_1 \beta_{B,i}^{s_{i21}}) \tag{105}$$

$$\xi_{A,i2} = F_{A,2}(g_2^{-1}) F_{A,2}(g_2 \beta_{B,i}^{s_{i22}}) \tag{106}$$

Likewise, the proxy calculation unit 21 of the key device $\mathbf{2}_2$ calculates, by Formula (107), a value $\xi_{B,i1}$ (hereinafter referred to as a first commission result) necessary for calculation of the common key for a homomorphism $F_{B,2}$:

$G \to G$, $h \to h^{s_B}$. Moreover, the proxy calculation unit 21 calculates, by Formula (108), a value $\xi_{B,i2}$ (hereinafter referred to as a second commission result) necessary for calculation of the common key.

$$\xi_{B,i1} = F_{B,2}(g_1^{-1}) F_{B,2}(g_1 \beta_{A,i}^{t_{i21}}) \tag{107}$$

$$\xi_{B,i2} = F_{B,2}(g_2^{-1}) F_{B,2}(g_2 \beta_{A,i}^{t_{i22}}) \tag{108}$$

In Step S14b, the verification unit 14 of the terminal device $1_1$ verifies, by Formula (109), whether or not a value (hereinafter referred to as a first verification value) obtained by raising the first commission result $\xi_{A,i1}$ to the $s_{i22}$-th power and a value (hereinafter referred to as a second verification value) obtained by raising the second commission result $\xi_{A,i2}$ to the $s_{i21}$-th power coincide with each other. Likewise, the verification unit 14 of the terminal device $1_2$ verifies, by Formula (110), whether or not a value (hereinafter referred to as a first verification value) obtained by raising the first commission result $\xi_{B,i1}$ to the $t_{i2}$-th power and a value (hereinafter referred to as a second verification value) obtained by raising the second commission result $\xi_{B,i2}$ to the $t_{i1}$-th power coincide with each other. If the first verification value and the second verification value coincide with each other, the processing proceeds to Step S151b. If the first verification value and the second verification value do not coincide with each other, the processing is returned to Step S12b.

$$\xi_{A,i1}^{s_{i22}} = \xi_{A,i2}^{s_{i21}} \tag{109}$$

$$\xi_{B,i1}^{t_{i22}} = \xi_{B,i2}^{t_{i21}} \tag{110}$$

In Step S151b, the common key calculation unit 15 of the terminal device $1_1$ calculates, by Formula (111), a commission result $\xi_{A,i}$ from the first commission result $\xi_{A,i1}$ and the second commission result $\xi_{A,i2}$ by using the random numbers $s'_{i21}$ and $s'_{i22}$. Likewise, the common key calculation unit 15 of the terminal device $1_2$ calculates, by Formula (112), a commission result $00\xi_{B,i}$ from the first commission result $\xi_{B,i1}$ and the second commission result $\xi_{B,i2}$ by using the random numbers $t'_{i1}$ and $t'_{i2}$.

$$\xi_{A,i} = \xi_{A,i1}^{s'_{i21}} \xi_{A,i2}^{s'_{i22}} = F_{A,2}(\beta_{B,i}^{s_{i21}s'_{i21} + s_{i22}s'_{i22}}) = F_{A,2}(\beta_{B,i}) \tag{111}$$

$$\xi_{B,i} = \xi_{B,i1}^{t'_{i21}} \xi_{B,i2}^{t'_{i22}} = F_{B,2}(\beta_{A,i}^{t_{i21}t'_{i21} + t_{i22}t'_{i22}}) = F_{B,2}(\beta_{A,i}) \tag{112}$$

In Step S152, the common key calculation unit 15 of the terminal device $1_1$ generates values $\sigma_1, \ldots, \sigma_m$ by calculating a value $\sigma_i$ for $i=1, \ldots, m$ by Formula (113). Likewise, the common key calculation unit 15 of the terminal device $1_2$ generates values $\sigma_1, \ldots, \sigma_m$ by calculating a value $\sigma_i$ for $i=1, \ldots, m$ by Formula (114).

$$\sigma_i = X_B^{c_{i,0,0}s_A + c_{i,1,0}x_A} S_B^{c_{i,1,0}s_A + c_{i,1,1}x_A} \tag{113}$$
$$= F_A(\alpha_{B,i}) F_{A,2}(\beta_{B,i})$$

$$\sigma_i = X_A^{c_{i,0,0}s_B + c_{i,0,1}x_B} S_A^{c_{i,1,0}s_B + c_{i,1,1}x_B} \tag{114}$$
$$= F_B(\alpha_{A,i}) F_{B,2}(\beta_{A,i})$$

In Step S154, the common key calculation units 15 of the terminal device $1_1$ and the terminal device $1_2$ calculate a common key K by using the values $\sigma_1, \ldots, \sigma_m$ by Formula (115).

$$K = H(\sigma_1, \ldots, \sigma_m, S_A, S_B, X_A, X_B) \tag{115}$$

Seventh Embodiment

A seventh embodiment is a cert-id AKE method using self-correction. The present embodiment is a configuration in which, in particular, the key device holds a secret key and the terminal device generates a short-term secret key.

Figure 11:
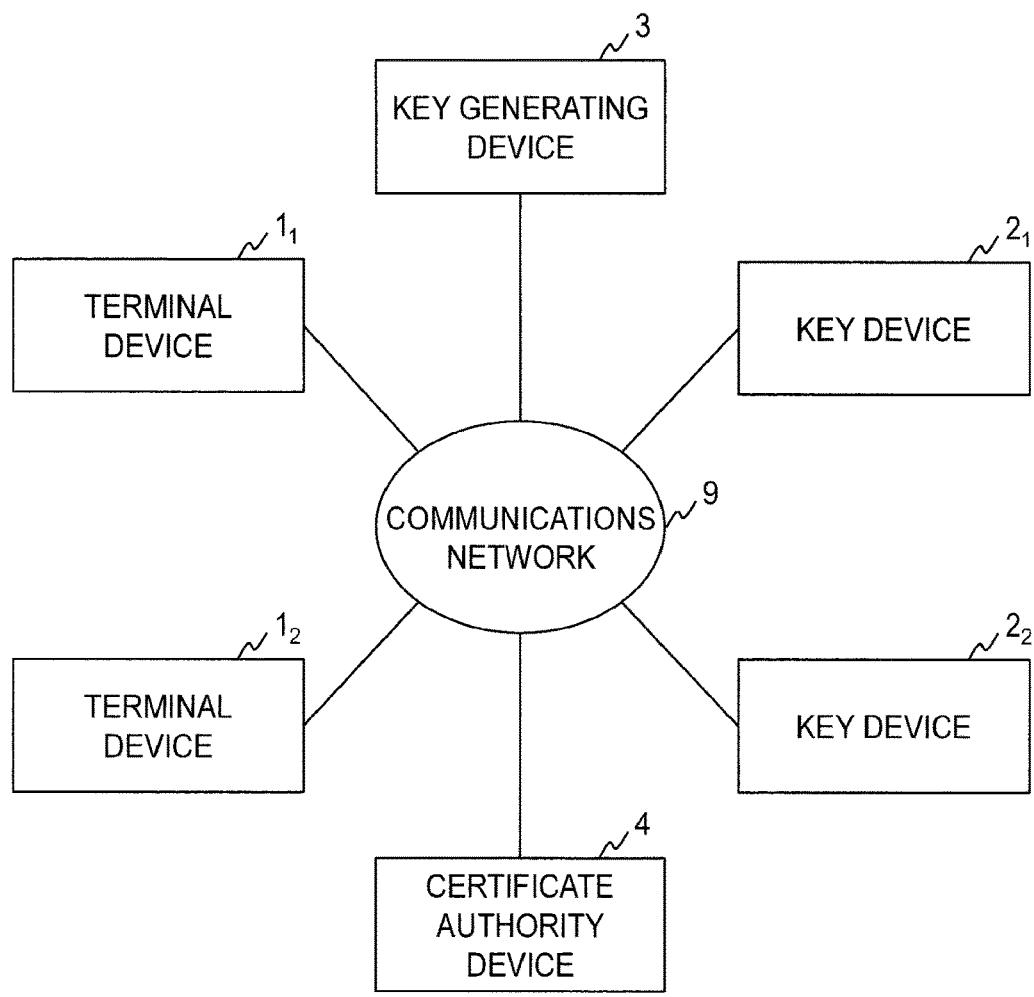
FIG. 11 is a diagram illustrating the functional configuration of a key exchange system of a seventh embodiment.

In addition to the terminal devices $1_1$ and $1_2$ and the key devices $2_1$ and $2_2$, as depicted in FIG. 11, for example, a key exchange system of the present embodiment includes a key generating device 3 and a certificate authority device 4.

Figure 12:
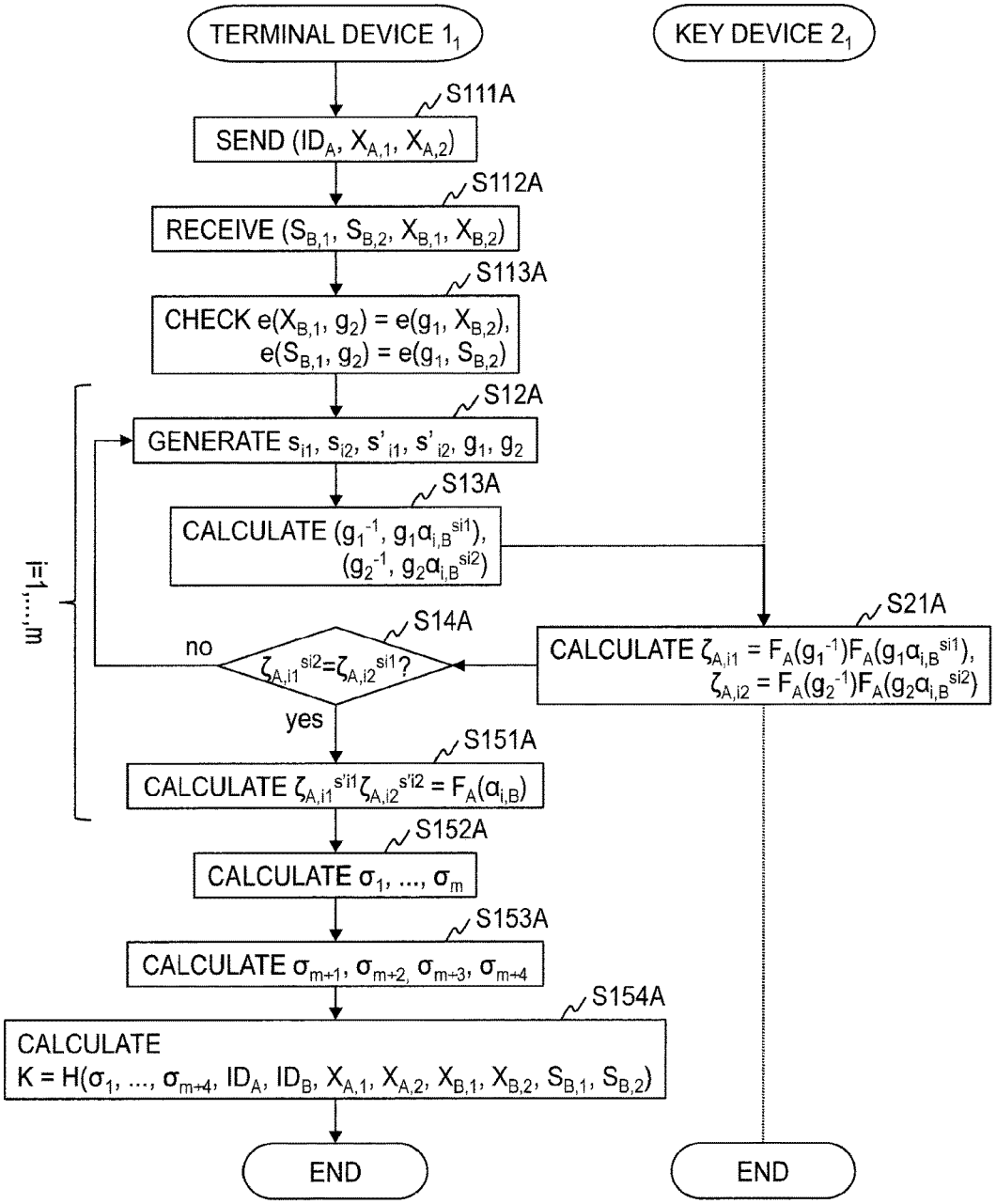
FIG. 12 is a diagram illustrating a processing flow of a key exchange method of the seventh embodiment.
Figure 13:
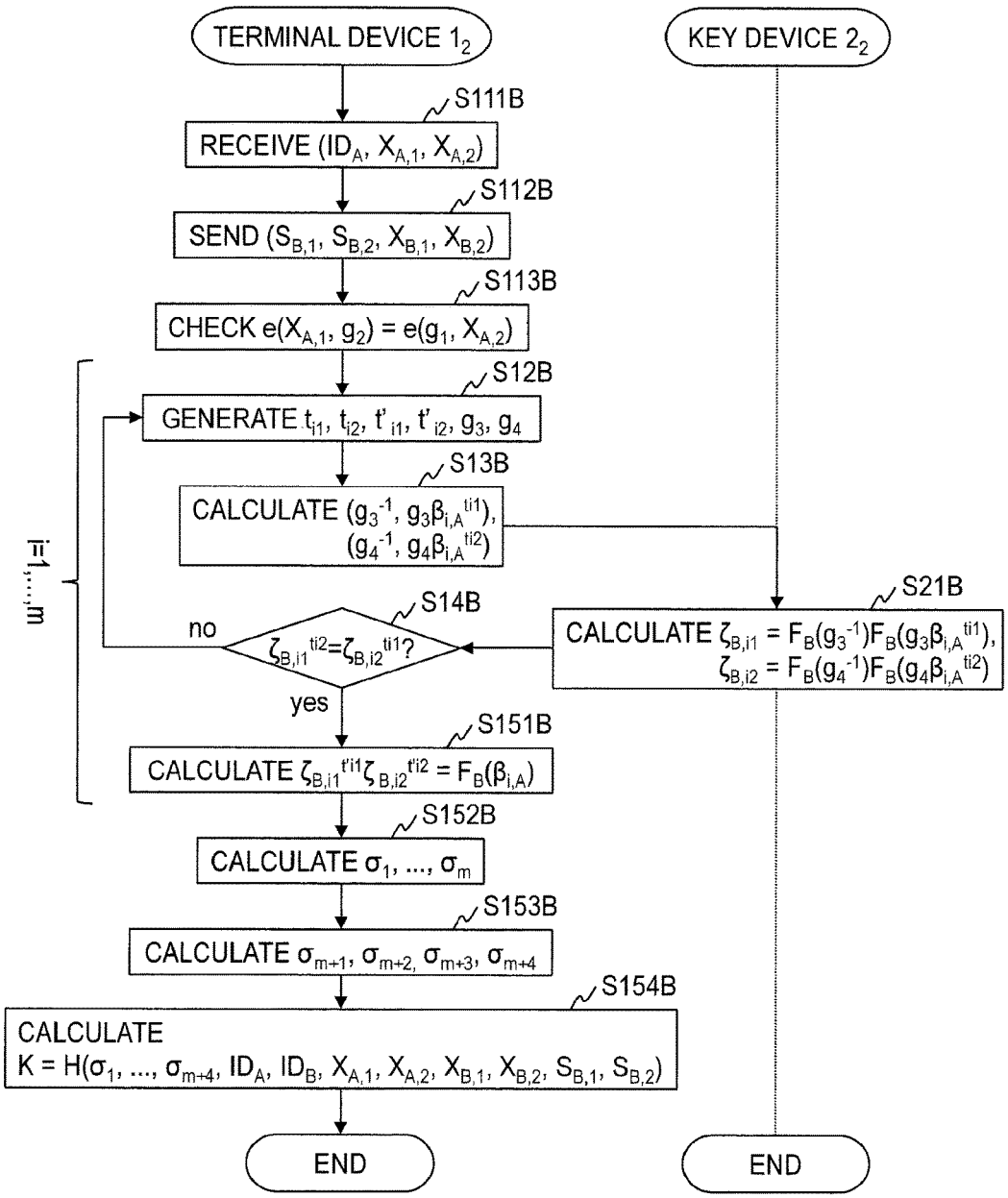
FIG. 13 is a diagram illustrating a processing flow of the key exchange method of the seventh embodiment.

Hereinafter, with reference to FIGS. 12 and 13, a processing procedure of a key exchange method of the present embodiment will be described. In the following description, a difference from the above-described fifth embodiment will be mainly explained. FIG. 12 illustrates a processing flow of the terminal device $1_1$ and the key device $2_1$, and FIG. 13 illustrates a processing flow of the terminal device $1_2$ and the key device $2_2$.

In the present embodiment, key generation is performed in the following manner. The key generating device 3 randomly selects a master secret key $z \in Z_q$, and calculates a pair of master public keys $(Z_1 = g_1^z \in G_1, Z_2 = g_2^z \in G_2)$ and makes the pair $(Z_1 = g_1^z \in G_1, Z_2 = g_2^z \in G_2)$ public. The terminal device $1_1$ calculates a pair of public keys $(Q_{A,1} = H_1(ID_A) \in G_1, Q_{A,2} = H_2(ID_A) \in G_2)$ by using an identifier $ID_A$ and makes the pair $(Q_{A,1} = H_1(ID_A) \in G_1, Q_{A,2} = H_2(ID_A) \in G_2)$ public. The key generating device 3 calculates a pair of secret keys $(D_{A,1} = Q_{A,1}^z, D_{A,2} = Q_{A,2}^z)$ by using the pair of public keys $(Q_{A,1}, Q_{A,2})$ and distributes the pair $(D_{A,1} = Q_{A,1}^z, D_{A,2} = Q_{A,2}^z)$ to the key device $2_1$. The key device $2_2$ randomly selects a secret key $s_B \in Z_q$, calculates a pair of public keys $(S_{B,1} = g_1^{s_B} \in G_1, S_{B,2} = g_2^{s_B} \in G_2)$, and sends the pair $(S_{B,1} = g_1^{s_B} \in G_1, S_{B,2} = g_2^{s_B} \in G_2)$ to the terminal device $1_2$. The certificate authority device 4 authenticates a public key $S_B$ of the key device $2_2$. The terminal device $1_1$ randomly selects a short-term secret key $Z_A \in Z_q$ and generates a pair of short-term public keys $(X_{A,1} = g_1^{x_A}, X_{A,2} = g_2^{x_A})$. Likewise, the terminal device $1_2$ randomly selects a short-term secret key $x_B \in Z_q$ and generates a pair of short-term public keys $(X_{B,1} = g_1^{x_B}, X_{B,2} = g_2^{x_B})$.

In Step S111A, the public key receiving unit 11 of the terminal device $1_1$ sends information $(ID_A, X_{A,1}, X_{A,2})$ formed of the identifier and the short-term public keys to the terminal device $1_2$. In Step S111B, the public key receiving unit 11 of the terminal device $1_2$ receives the information $(ID_A, X_{A,1}, X_{A,2})$ from the terminal device $1_1$.

In Step S112B, the public key receiving unit 11 of the terminal device $1_2$ sends information $(S_{B,1}, S_{B,2}, X_{B,1}, X_{B,2})$ formed of the public keys and the short-term public keys to the terminal device $1_1$. In Step S112A, the public key receiving unit 11 of the terminal device $1_1$ receives the information $(S_{B,1}, S_{B,2}, X_{B,1}, X_{B,2})$ from the terminal device $1_2$.

In Step S113A, the public key receiving unit 11 of the terminal device $1_1$ checks whether or not Formula (116) holds. In Step S113B, the public key receiving unit 11 of the terminal device $1_2$ checks whether or not Formula (117) holds. If any one of these formulas is not correct, the processing is performed again from key generation.

$$e(X_{B,1}, g_2) e(g_1, X_{B,2}), e(S_{B,1}, g_2) e(g_1, S_{B,2}) \tag{116}$$

$$e(X_{A,1}, g_2) e(g_1, X_{A,2}) \tag{117}$$

In the present embodiment, processing in Steps S12A, S13A, S21A, S14A, and S151A of FIG. 12 is repeatedly performed m times. In the following description, a processing procedure in the i (=1, ..., m)-th repetition of the processing will be described.

In Step S12A, the random number generating unit 12 of the terminal device $1_1$ generates random numbers $s_{i1}$, $s_{i2}$, $s'_{i1}$, $s'_{i2} \in Z$ and group elements $g_1$, $g_2 \in G$. Here, $s_{i1}$ and $s_{i2}$ are assumed to be mutually prime and satisfy $s_{i1}s'_{i1}+s_{i2}s'_{i2}=1$. An assumption is made that $g_1$ and $g_2$ are elements which are not unit elements of the group G.

In Step S13A, the public keys randomizing unit 13 of the terminal device $1_1$ calculates, by Formula (118), values (hereinafter referred to as first randomized public keys information) obtained by randomizing the public key $S_{B,2}$ and the short-term public key $X_{B,2}$ of the terminal device $1_2$ by using the random number $s_{i1}$. Moreover, the public keys randomizing unit 13 calculates, by Formula (119), values (hereinafter referred to as second randomized public keys information) obtained by randomizing the public key $S_{B,2}$ and the short-term public key $X_{B,2}$ of the terminal device $1_2$ by using the random number $s_{i2}$. The public keys randomizing unit 13 sends a pair of the calculated first randomized public keys information and second randomized public keys information to the key device $2_1$.

$$(g_1^{-1}, g_1\alpha_{i,B}^{s_{i1}}) \quad (118)$$

$$(g_2^{-1}, g_2\alpha_{i,B}^{s_{i2}}) \quad (119)$$

where
$\alpha_{i,B} = S_{B,2}^{c_{i,0,0}} X_{B,2}^{c_{i,0,1}}$

In Step S21A, the proxy calculation unit 21 of the key device $2_1$ calculates, by Formula (120), a value $\zeta_{A,i1}$ (hereinafter referred to as a first commission result) necessary for calculation of a common key for a homomorphism $F_A$: $G_2 \to G_T$, $h_2 \to e(D_{A,1}, h_2)$. Moreover, the proxy calculation unit 21 calculates, by Formula (121), a value $\zeta_{A,i2}$ (hereinafter referred to as a second commission result) necessary for calculation of the common key. The proxy calculation unit 21 sends the calculated first commission result $\zeta_{A,i1}$ and second commission result $\zeta_{A,i2}$ to the terminal device $1_1$.

$$\zeta_{A,i1} = F_A(g_1^{-1})F_A(g_1\alpha_{i,B}^{s_{i1}}) \quad (120)$$

$$\zeta_{A,i2} = F_A(g_2^{-1})F_A(g_2\alpha_{i,B}^{s_{i2}}) \quad (121)$$

In Step S14A, the verification unit 14 of the terminal device $1_1$ verifies, by Formula (122), whether or not a value (hereinafter referred to as a first verification value) obtained by raising the first commission result $\zeta_{A,i1}$ to the $s_{i2}$-th power and a value (hereinafter referred to as a second verification value) obtained by raising the second commission result $\zeta_{A,i2}$ to the $s_{i1}$-th power coincide with each other. If the first verification value and the second verification value coincide with each other, the processing proceeds to Step S151A. If the first verification value and the second verification value do not coincide with each other, the processing is returned to Step S12A.

$$\zeta_{A,i1}^{s_{i2}} = \zeta_{A,i2}^{s_{i1}} \quad (122)$$

In Step S151A, the common key calculation unit 15 of the terminal device $1_1$ calculates, by Formula (123), a commission result $\zeta_{A,i}$ from the first commission result $\zeta_{A,i1}$ and the second commission result $\zeta_{A,i2}$ by using the random numbers $s'_{i1}$ and $s'_{i2}$.

$$\zeta_{A,i} = \zeta_{A,i1}^{s'_{i1}}\zeta_{A,i2}^{s'_{i2}} = F_A(\alpha_{i,B}^{s_{i1}s'_{i1}+s_{i2}s'_{i2}}) = F_A(\alpha_{i,B}) \quad (122)$$

In Step S152A, the common key calculation unit 15 of the terminal device $1_1$ generates values $\sigma_1, \ldots, \sigma_m$ by calculating a value $\sigma_i$ for i=1, ..., m by Formula (124).

$$\sigma_i = e(D_{A,1}^{c_{i,0,0}} Z_1^{c_{i,1,0}x_A}, S_{B,2})e(D_{A,1}^{c_{i,0,1}} Z_1^{c_{i,1,1}x_A}, X_{B,2}) \quad (124)$$

$$= F_A(\alpha_{i,B})e(Z_1, S_{B,2}^{c_{i,1,0}x_A} X_{B,2}^{c_{i,1,1}x_A})$$

In Step S153A, the common key calculation unit 15 of the terminal device $1_1$ calculates values $\sigma_{m+1}$, $\sigma_{m+2}$, $\sigma_{m+3}$, and $\sigma_{m+4}$ by Formula (125).

$$\sigma_{m+1}=X_{B,1}^{x_A}, \sigma_{m+2}=X_{B,2}^{x_A},$$

$$\sigma_{m+3}=S_{B,1}^{x_A}, \sigma_{m+4}=S_{B,2}^{x_A} \quad (125)$$

In Step S154A, the common key calculation unit 15 of the terminal device $1_1$ calculates a common key K by using the values $\sigma_1, \ldots, \sigma_{m+4}$ by Formula (126).

$$K=H(\sigma_1, \ldots, \sigma_{m+4}, ID_A, ID_B, X_{A,1}, X_{A,2}, X_{B,1}, X_{B,2}, S_{B,1}, S_{B,2}) \quad (126)$$

In the present embodiment, processing in Steps S12B, S13B, S21B, S14B, and S151B of FIG. 13 is repeatedly performed m times. In the following description, a processing procedure in the i (=1, ..., m)-th repetition of the processing will be described.

In Step S12B, the random number generating unit 12 of the terminal device $1_2$ generates random numbers $t_{i1}$, $t_{i2}$, $t'_{i1}$, $t'_{i2} \in Z$ and group elements $g_3$, $g_4 \in G$. Here, $t_{i1}$ and $t_{i2}$ are assumed to be mutually prime and satisfy $t_{i1}t'_{i1}+t_{i2}t'_{i2}=1$. An assumption is made that $g_3$ and $g_4$ are elements which are not unit elements of the group G.

In Step S13B, the public keys randomizing unit 13 of the terminal device $1_1$ calculates, by Formula (127), values (hereinafter referred to as first randomized public keys information) obtained by randomizing the public key $Q_{A,1}$ and the short-term public key $X_{A,1}$ of the terminal device $1_2$ by using the random number $t_{i1}$. Moreover, the public keys randomizing unit 13 calculates, by Formula (128), values (hereinafter referred to as second randomized public keys information) obtained by randomizing the public key $Q_{A,1}$ and the short-term public key $X_{A,1}$ of the terminal device $1_2$ by using the random number $t_{i2}$. The public keys randomizing unit 13 sends a pair of the calculated first randomized public keys information and second randomized public keys information to the key device $2_1$.

$$(g_3^{-1}, g_3\beta_{i,A}^{t_{i1}}) \quad (127)$$

$$(g_4^{-1}, g_4\beta_{i,A}^{t_{i2}}) \quad (128)$$

where
$\beta_{i,A} = Q_{A,1}^{c_{i,0,0}} X_{A,1}^{c_{i,1,0}}$

In Step S21B, the proxy calculation unit 21 of the key device $2_2$ calculates, by Formula (129), a value $\zeta_{B,i1}$ (hereinafter referred to as a first commission result) necessary for calculation of a common key for a homomorphism $F_B$: $G_1 \to G_T$, $h_1 \to e(h_1, Z_2^{s_B})$. Moreover, the proxy calculation unit 21 calculates, by Formula (130), a value $\zeta_{B,i2}$ (hereinafter referred to as a second commission result) necessary for calculation of the common key. The proxy calculation unit 21 sends the calculated first commission result $\zeta_{B,i1}$ and second commission result $\zeta_{B,i2}$ to the terminal device $1_2$.

$$\zeta_{B,i1} = F_B(g_1^{-1})F_B(g_1\beta_{i,A}^{t_{i1}}) \quad (129)$$

$$\zeta_{B,i2} = F_B(g_2^{-1})F_B(g_2\beta_{i,A}^{t_{i2}}) \quad (130)$$

In Step S14B, the verification unit 14 of the terminal device $1_2$ verifies, by Formula (131), whether or not a value (hereinafter referred to as a first verification value) obtained by raising the first commission result $\zeta_{B,i1}$ to the $t_{i2}$-th power and a value (hereinafter referred to as a second verification value) obtained by raising the second commission result $\zeta_{B,i2}$ to the $t_{i1}$-th power coincide with each other. If the first verification value and the second verification value coincide with each other, the processing proceeds to Step S151B. If the first verification value and the second verification value do not coincide with each other, the processing is returned to Step S12B.

$$\zeta_{B,i1}{}^{t i2}=\zeta_{B,i2}{}^{t i1} \qquad (131)$$

In Step S151B, the common key calculation unit 15 of the terminal device $1_2$ calculates, by Formula (132), a commission result $\zeta_{B,i}$ from the first commission result $\zeta_{B,i1}$ and the second commission result $\zeta_{B,i2}$ by using the random numbers $t'_{i1}$ and $t'_{i2}$.

$$\zeta_{B,i}=\zeta_{B,i1}{}^{t'i1}\zeta_{B,i2}{}^{t'i2}=F_B(\beta_{i,A}{}^{t i1 t' i1 + t i2 t' i2})=F_B(\beta_{i,A}) \qquad (132)$$

In Step S152B, the common key calculation unit 15 of the terminal device $1_2$ generates values $\sigma_1, \ldots, \sigma_m$ by calculating a value $\sigma_i$ for $i=1, \ldots, m$ by Formula (133).

$$\sigma_i = e(Q_{A,1}, Z_2^{c_{i,0,0}s_B+c_{i,0,1}x_B})e(X_{A,2}, Z_2^{c_{i,1,0}s_B+c_{i,1,1}x_B}) \qquad (133)$$

$$= F_B(\beta_{i,A})e(Q_{A,1}^{c_{i,0,1}} X_{A,2}^{c_{i,1,1}}, Z_2^{x_B})$$

In Step S153B, the common key calculation unit 15 of the terminal device $1_2$ calculates values $\sigma_{m+1}$ and $\sigma_{m+2}$ by Formula (134). Moreover, the common key calculation unit 15 commissions the key device $2_2$ to calculate values $\sigma_{m+3}$ and $\sigma_{m+4}$ by Formula (135).

$$\sigma_{m+1}=X_{A,1}{}^{x_B}, \sigma_{m+2}=X_{A,2}{}^{x_B} \qquad (134)$$

$$\sigma_{m+3}=X_{A,1}{}^{s_B}, \sigma_{m+4}=X_{A,2}{}^{s_B} \qquad (135)$$

In Step S154B, the common key calculation unit 15 of the terminal device $1_1$ calculates a common key K by using the values $\sigma_1, \ldots, \sigma_{m+4}$ by Formula (136).

$$K=H(\sigma_1, \ldots, \sigma_{m+4}, ID_A, ID_B, X_{A,1}, X_{A,2}, X_{B,1}, X_{B,2}, S_{B,1}, S_{B,2}) \qquad (136)$$

All of the values $\sigma_1, \ldots, \sigma_{m+2}$ calculated by the common key calculation units 15 of the terminal device $1_1$ and the terminal device $1_2$ can be expressed as in Formula (137) on the assumption that $i=1, \ldots, m$. Therefore, the common key K calculated by the terminal device $1_1$ and the common key K calculated by the terminal device $1_2$ coincide with other.

$$\sigma_i = g_T^{z p_i(Q_{A,1}, S_B, x_A, X_B)},$$

$$\sigma_{m+1}=g_1^{x_A x_B},$$

$$\sigma_{m+2}=g_2^{x_A x_B} \qquad (137)$$

Incidentally, in the present embodiment, calculation of Formula (138) is performed by proxy calculation which is performed in Steps S13B and S21B.

$$e(Q_{A,1}^{c_{i,0,0}} X_{A,1}^{c_{i,1,0}}, Z_2^{s_B}) \qquad (138)$$

Thus, by replacing $\beta_{i,A}$ with $\beta'_{i,A}$ of Formula (139) in Step S13B and replacing the homomorphism $F_B: G_1 \to G_T$, $h_1 \to e(h_1, Z_2^{sB})$ with $F'_B: G_T \to G_T$, $h_T \to h_T^{sB}$ in Step S21B, it is also possible to perform similar proxy calculation.

$$\beta'_{i,A}=e(Q_{A,1}^{c_{i,0,0}} X_{A,1}^{c_{i,1,0}}, Z_2) \qquad (139)$$

[Modification 7]

Modification 7 is a modification of the cert-id AKE method using self-correction of the seventh embodiment. The present modification is a configuration in which, in particular, the key device holds a secret key and the key device generates a short-term secret key.

Hereinafter, a processing procedure of a key exchange method of the present modification will be described. In the following description, a difference from the above-described seventh embodiment will be mainly explained.

In the present modification, key generation is performed in the following manner. The key generating device 3 randomly selects a master secret key $z \in Z_q$, and calculates a pair of master public keys $(Z_1=g_1^z \in G_1, Z_2=g_2^z \in G_2)$ and makes the pair $(Z_1=g_1^z \in G_1, Z_2=g_2^z \in G_2)$ public. The terminal device $1_1$ calculates a pair of public keys $(Q_{A,1}=H_1(ID_A) \in G_1, Q_{A,2}=H_2(ID_A) \in G_2)$ by using an identifier $ID_A$ and makes the pair $(Q_{A,1}=H_1(ID_A) \in G_1, Q_{A,2}=H_2(ID_A) \in G_2)$ public. The key generating device 3 calculates a pair of secret keys $(D_{A,1}=Q_{A,1}^z, D_{A,2}=Q_{A,2}^z)$ by using the pair of public keys $(Q_{A,1}, Q_{A,2})$ and distributes the pair $(D_{A,1}=Q_{A,1}^z, D_{A,2}=Q_{A,2}^z)$ to the key device $2_1$. The key device $2_2$ randomly selects a secret key $s_B \in Z_q$, and calculates a pair of public keys $(S_{B,1}=g_1^{s_B} \in G_1, S_{B,2}=g_2^{s_B} \in G_2)$ and sends the pair $(S_{B,1}=g_1^{s_B} \in G_1, S_{B,2}=g_2^{s_B} \in G_2)$ to the terminal device $1_2$. The certificate authority device 4 authenticates a public key $S_B$ of the key device $2_2$. The key device $2_1$ randomly selects a short-term secret key $z_A \in Z_q$, generates a pair of short-term public keys $(X_{A,1}=g_1^{x_A}, X_{A,2}=g_2^{x_A})$, and sends the pair $(X_{A,1}=g_1^{x_A}, X_{A,2}=g_2^{x_A})$ to the terminal device $1_1$. Likewise, the key device $2_2$ randomly selects a short-term secret key $z_B \in Z_q$, generates a pair of short-term public keys $(X_{B,1}=g_1^{x_B}, X_{B,2}=g_2^{x_B})$, and sends the pair $(X_{B,1}=g_1^{x_B}, X_{B,2}=g_2^{x_B})$ to the terminal device $1_2$.

In the present modification, after the processing in Steps S12A, S13A, S21A, S14A, and S151A is repeatedly performed m times, processing in the following Steps S12Ab, S13Ab, S21Ab, S14Ab, and S151Ab (not depicted in the drawing) is repeatedly performed m times. In the following description, a processing procedure in the $i$ ($=1, \ldots, m$)-th repetition of the processing will be described.

In Step S12Ab, the random number generating unit 12 of the terminal device $1_1$ generates random numbers $s_{i21}, s_{i22}, s'_{i21}, s'_{i22} \in Z$ and group elements $g_1$ and $g_2 \in G$. Here, $s_{i21}$ and $s_{i22}$ are assumed to be mutually prime and satisfy $s_{i21}s'_{i21}+s_{i22}s'_{i22}=1$. An assumption is made that $g_1$ and $g_2$ are elements which are not unit elements of the group G.

In Step S13Ab, the public keys randomizing unit 13 of the terminal device $1_1$ calculates, by Formula (140), values (hereinafter referred to as first randomized public keys information) obtained by randomizing the public key $S_{B,2}$ and the short-term public key $X_{B,2}$ of the terminal device $1_2$ by using the random number $s_{i21}$. Moreover, the public keys randomizing unit 13 calculates, by Formula (141), values (hereinafter referred to as second randomized public keys information) obtained by randomizing the public key $S_{B,2}$ and the short-term public key $X_{B,2}$ of the terminal device $1_2$ by using the random number $s_{i22}$. The public keys randomizing unit 13 sends a pair of the calculated first randomized public keys information and second randomized public keys information to the key device $2_1$.

$$(g_1^{-1}, g_1 \beta_{i,B}{}^{s i21}) \qquad (140)$$

$$(g_2^{-1}, g_2 \beta_{i,B}{}^{s i22}) \qquad (141)$$

where
$\beta_{i,B}=S_{B,2}{}^{c_{i,1,0}} X_{B,2}{}^{c_{i,1,1}}$

In Step S21Ab, the proxy calculation unit 21 of the key device $2_1$ calculates, by Formula (142), a value $\xi_{A,i1}$ (hereinafter referred to as a first commission result) necessary for calculation of a common key for a homomorphism $F_{1A}$:

$G_2 \to G_T$, $h_2 \to e(Z_1^{xA}, h_2)$. Moreover, the proxy calculation unit 21 calculates, by Formula (143), a value $\xi_{A,i2}$ (hereinafter referred to as a second commission result) necessary for calculation of the common key. The proxy calculation unit 21 sends the calculated first commission result $\xi_{A,i1}$ and second commission result $\xi_{A,i2}$ to the terminal device $\mathbf{1}_1$.

$$\xi_{A,i1} = F_{1,A}(g_1^{-1})F_{1,A}(g_1\beta_{i,B}^{s_{i21}}) \tag{142}$$

$$\xi_{A,i2} = F_{1,A}(g_2^{-1})F_{1,A}(g_2\beta_{i,B}^{s_{i22}}) \tag{143}$$

In Step S14Ab, the verification unit 14 of the terminal device $\mathbf{1}_1$ verifies, by Formula (144), whether or not a value (hereinafter referred to as a first verification value) obtained by raising the first commission result $\xi_{A,i1}$ to the $s_{i22}$-th power and a value (hereinafter referred to as a second verification value) obtained by raising the second commission result $\xi_{A,i2}$ to the $s_{i21}$-th power coincide with each other. If the first verification value and the second verification value coincide with each other, the processing proceeds to Step S151Ab. If the first verification value and the second verification value do not coincide with each other, the processing is returned to Step S12Ab.

$$\xi_{A,i1}^{s_{i22}} = \xi_{A,i2}^{s_{i21}} \tag{144}$$

In Step S151Ab, the common key calculation unit 15 of the terminal device $\mathbf{1}_1$ calculates, by Formula (145), a commission result $\xi_{A,i}$ from the first commission result $\xi_{A,i1}$ and the second commission result $\xi_{A,i2}$ by using the random numbers $s'_{i21}$ and $s'_{i22}$.

$$\xi_{A,i} = \xi_{A,i1}^{s'_{i21}}\xi_{A,i2}^{s'_{i22}} = F_{1,A}(\beta_{i,B}^{s_{i21}s'_{i21}+s_{i22}s'_{i22}}) = F_{1,A}(\beta_{i,B}) \tag{145}$$

In Step S152A, the common key calculation unit 15 of the terminal device $\mathbf{1}_1$ generates values $\sigma_1, \ldots, \sigma_m$ by calculating a value $\sigma_i$ for $i=1, \ldots, m$ by Formula (146).

$$\sigma_i = e\left(D_{A,1}^{c_{i,0,0}} Z_1^{c_{i,1,0}xA}, S_{B,2}\right) e\left(D_{A,1}^{c_{i,0,1}} Z_1^{c_{i,1,1}xA}, X_{B,2}\right) \tag{146}$$
$$= F_A(\alpha_{i,B})F_{1,A}(\beta_{i,B})$$

The processing in Steps S153A and S154A is similar to that of the seventh embodiment.

In the present modification, after the processing in Steps S12B, S13B, S21B, S14B, and S151B is repeatedly performed m times, processing in the following Steps S12Bb, S13Bb, S21Bb, S14Bb, and S151Bb (not depicted in the drawing) is repeatedly performed m times. In the following description, a processing procedure in the i (=1, ..., m)-th repetition of the processing will be described.

In Step S12Bb, the random number generating unit 12 of the terminal device $\mathbf{1}_2$ generates random numbers $t_{i21}, t_{i22}, t'_{i21}, t'_{i22} \in Z$ and group elements $g_3, g_4 \in G$. Here, $t_{i21}$ and $t_{i22}$ are assumed to be mutually prime and satisfy $t_{i21}t'_{i21} + t_{i22}t'_{i22} = 1$. An assumption is made that $g_3$ and $g_4$ are elements which are not unit elements of the group G.

In Step S13Bb, the public keys randomizing unit 13 of the terminal device $\mathbf{1}_1$ calculates, by Formula (147), values (hereinafter referred to as first randomized public keys information) obtained by randomizing the public key $Q_{A,1}$ and the short-term public key $X_{A,1}$ of the terminal device $\mathbf{1}_2$ by using the random number $t_{i21}$. Moreover, the public keys randomizing unit 13 calculates, by Formula (148), values (hereinafter referred to as second randomized public keys information) obtained by randomizing the public key $Q_{A,1}$ and the short-term public key $X_{A,1}$ of the terminal device $\mathbf{1}_2$ by using the random number $t_{i22}$. The public keys randomizing unit 13 sends a pair of the calculated first randomized public keys information and second randomized public keys information to the key device $\mathbf{2}_1$.

$$(g_3^{-1}, g_3\beta_{1,i,A}^{t_{i21}}) \tag{147}$$

$$(g_4^{-1}, g_4\beta_{1,i,A}^{t_{i22}}) \tag{148}$$

where
$\beta_{1,i,A} = Q_{A,1}^{c_{i,0,1}} X_{A,1}^{c_{i,1,1}}$

In Step S21Bb, the proxy calculation unit 21 of the key device $\mathbf{2}_2$ calculates, by Formula (149), a value $\xi_{B,i1}$ (hereinafter referred to as a first commission result) necessary for calculation of a common key for a homomorphism $F_{1,B}$: $G_1 \to G_T$, $h_1 \to e(h_1, Z_2^{xB})$. Moreover, the proxy calculation unit 21 calculates, by Formula (150), a value $\xi_{B,i2}$ (hereinafter referred to as a second commission result) necessary for calculation of the common key. The proxy calculation unit 21 sends the calculated first commission result $\xi_{B,i1}$ and second commission result $\xi_{B,i2}$ to the terminal device $\mathbf{1}_2$.

$$\xi_{B,i1} = F_{1,B}(g_1^{-1})F_{1,B}(g_1\beta_{1,i,A}^{t_{i21}}) \tag{149}$$

$$\xi_{B,i2} = F_{1,B}(g_2^{-1})F_{1,B}(g_2\beta_{1,i,A}^{t_{i22}}) \tag{150}$$

In Step S14Bb, the verification unit 14 of the terminal device $\mathbf{1}_2$ verifies, by Formula (151), whether or not a value (hereinafter referred to as a first verification value) obtained by raising the first commission result $\xi_{B,i1}$ to the $t_{i22}$-th power and a value (hereinafter referred to as a second verification value) obtained by raising the second commission result $\xi_{B,i2}$ to the $t_{i21}$-th power coincide with each other. If the first verification value and the second verification value coincide with each other, the processing proceeds to Step S151Bb. If the first verification value and the second verification value do not coincide with each other, the processing is returned to Step S12Bb.

$$\xi_{B,i1}^{t_{i22}} = \xi_{B,i2}^{t_{i21}} \tag{151}$$

In Step S151Bb, the common key calculation unit 15 of the terminal device $\mathbf{1}_2$ calculates, by Formula (152), a commission result $\xi_{B,i}$ from the first commission result $\xi_{B,i1}$ and the second commission result $\xi_{B,i2}$ by using the random numbers $t'_{i21}$ and $t'_{i22}$.

$$\xi_{B,i} = \xi_{B,i1}^{t'_{i21}}\xi_{B,i2}^{t'_{i22}} = F_{1,B}(\beta_{1,i,A}^{t_{i21}t'_{i21}+t_{i22}t'_{i22}}) = F_{1,B}(\beta_{1,i,A}) \tag{152}$$

In Step S152B, the common key calculation unit 15 of the terminal device $\mathbf{1}_2$ generates values $\sigma_1, \ldots, \sigma_m$ by calculating a value $\sigma_i$ for $i=1, \ldots, m$ by Formula (153).

$$\sigma_i = e\left(Q_{A,1}, Z_2^{c_{i,0,0}s_B+c_{i,0,1}xB}\right) e\left(X_{A,2}, Z_2^{c_{i,1,0}s_B+c_{i,1,1}xB}\right) \tag{153}$$
$$= F_B(\beta_{i,A})F_{1,B}(\beta_{1,i,A})$$

The processing in Steps S153B and S154B is similar to that of the seventh embodiment.

In the present modification, calculation of Formula (154) is performed by proxy calculation which is performed in Steps S13Ab and S21Ab.

$$e(Z_1^{xA}, S_{B,2}^{c_{i,1,0}} X_{B,2}^{c_{i,1,1}}) \tag{154}$$

Thus, by replacing $\beta_{i,B}$ with $\beta'_{i,B}$ of Formula (155) in Step S13Ab and replacing the homomorphism $F_{1,A}$: $G_2 \to G_T$, $h_2 \to e(Z_1^{xA}, h_2)$ with $F_{2,A}$: $G_T \to G_T$, $h_T \to g_T^{xA}$ in Step S21Ab, it is also possible to perform similar proxy calculation.

$$\beta'_{i,B} = e(Z_1, S_{B,2}^{c_{i,1,0}} X_{B,2}^{c_{i,1,1}}) \tag{155}$$

Moreover, in the present modification, by proxy calculation which is performed in Steps S13Bb and S21Bb, calculation of Formula (156) is performed.

$$e(Q_{A,1}{}^{ci,0,1}X_{A,1}{}^{ci,1,1},Z_2{}^{xB}) \tag{156}$$

Thus, by replacing $\beta_{1,i,A}$ with $\beta_{2,i,A}$ of Formula (157) in Step S13Bb and replacing the homomorphism $F_{1,B}$: $G_1 \to G_T$, $h_1 \to e(h_1, Z_2{}^{xB})$ with $F_{2,B}$: $G_T \to G_T$, $h_T \to g_T{}^{xB}$ in Step S21Bb, it is also possible to perform similar proxy calculation.

$$\beta_{2,i,A} = e(Q_{A,1}{}^{ci,0,0}X_{A,1}{}^{ci,1,0},Z_2) \tag{157}$$

Eighth Embodiment

An eighth embodiment is a configuration in which the key device stores intrinsic information of the terminal device and only the terminal device that has registered intrinsic information in advance can commission proxy calculation. In the following description, a configuration in which the above configuration is applied to the first embodiment will be described as an example, but the above configuration can also be applied to each of the above-described embodiments in a similar manner.

Hereinafter, a processing procedure of a key exchange method of the present embodiment will be described. In the following description, a difference from the above-described first embodiment will be mainly explained.

In the present embodiment, in the storage 10 of the terminal device $1_1$, in addition to the public key $g^x$ of the terminal device $1_1$, intrinsic information $Add_1$ is stored. In the storage 20 of the key device $2_1$, in addition to the secret key x of the terminal device $1_1$, a list $List_1$ is stored. In the list $List_1$, the intrinsic information $Add_1$ of the terminal device $1_1$ is registered in advance.

In Step S13, the public keys randomizing unit 13 of the terminal device $1_1$ sends, in addition to the pair of the first randomized public keys information and the second randomized public keys information, the intrinsic information $Add_1$ to the key device $2_1$.

In Step S21, the proxy calculation unit 21 of the key device $2_1$ checks whether or not the received intrinsic information $Add_1$ is registered in the list $List_1$ of the storage 20. If the received intrinsic information $Add_1$ is registered in the list $List_1$, the proxy calculation unit 21 calculates a first commission result $Z_1$ and a second commission result $Z_2$. If the received intrinsic information $Add_1$ is not registered in the list $List_1$, the proxy calculation unit 21 ends the processing without performing proxy calculation.

It goes without saying that this invention is not limited to the above-described embodiments and changes may be made thereto as appropriate without departing from the spirit of this invention. The various kinds of processing described in the above embodiments may be executed, in addition to being executed in chronological order in accordance with the descriptions, in parallel or individually depending on the processing power of a device that executes the processing or when needed.

[Programs, Recording Media]

When the various processing functions of each device described in the above embodiments are implemented by a computer, the processing details of the functions supposed to be provided in each device are described by a program. Then, as a result of this program being executed by the computer, the various processing functions in each device described above are implemented on the computer.

The program describing the processing details can be recorded on a computer-readable recording medium. The computer-readable recording medium may be any computer-readable recording medium such as a magnetic recording device, an optical disk, a magneto-optical recording medium, or semiconductor memory.

Moreover, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. Moreover, as another mode of execution of this program, the computer may read the program directly from the portable recording medium and execute the processing in accordance with the program and, furthermore, every time the program is transferred to the computer from the server computer, the computer may sequentially execute the processing in accordance with the received program. In addition, a configuration may be adopted in which the transfer of a program to the computer from the server computer is not performed and the above-described processing is executed by so-called application service provider (ASP)-type service by which the processing functions are implemented only by an instruction for execution thereof and result acquisition. Incidentally, the program in the present embodiment is assumed to include information (data or the like which is not a direct command to the computer but has the property of defining the processing of the computer) which is used for processing by an electronic calculator and is equivalent to a program.

Moreover, in this embodiment, the present device is assumed to be configured as a result of a predetermined program being executed on the computer, but at least part of these processing details may be implemented on the hardware.

What is claimed is:

1. A key exchange method, wherein
   $s_1$ and $s_2$ are assumed to be random numbers which are mutually prime and $s'_1$ and $s'_2$ are assumed to be random numbers which satisfy a predetermined relationship with the random numbers $S_1$ and $s_2$,
   the key exchange method includes:
      storing, in a storage of a key device, a secret key of a terminal device;
      generating, by circuitry of the terminal device, the random numbers $s_1$, $s_2$, $s'_1$, and $s'_2$;
      generating, by circuitry of the terminal device, first randomized public keys information obtained by randomizing a public key of the terminal device and a public key of another terminal device by using the random number $s_1$ and second randomized public keys information obtained by randomizing the public key of the terminal device and the public key of the other terminal device by using the random number $s_2$;
      calculating, by circuitry of the key device, a first commission result from the first randomized public keys information by using the secret key and calculating a second commission result from the second randomized public keys information by using the secret key;

calculating, by circuitry of the terminal device, a first verification value from the first commission result by using the random number $s_2$, calculating a second verification value from the second commission result by using the random number $s_1$, and verifying whether or not the first verification value and the second verification value coincide with each other; and calculating, by circuitry of the terminal device, if the first verification value and the second verification value coincide with each other, a common key from the first commission result and the second commission result by using the random numbers $s'_1$ and $s'_2$.

2. The key exchange method according to claim 1, wherein g is assumed to be an element of a group G, x is assumed to be the secret key of the terminal device, $g^x$ is assumed to be the public key of the terminal device, y is assumed to be a secret key of the other terminal device, $g^y$ is assumed to be the public key of the other terminal device, and $r_1$ and $r_2$ are assumed to be arbitrary numbers, calculating, by circuitry of the terminal device, the first randomized public keys information by a formula below:

$$(g^{r1x}, g^{s1y+r1})$$

and calculating the second randomized public keys information by a formula below:

$$(g^{r2x}, g^{s2y+r2}),$$

calculating, by circuitry of the key device, the first commission result $Z_i$ by a formula below:

$$Z_1 = g^{-r1x} g^{(s1y+r1)x}$$

and calculating the second commission result $Z_2$ by a formula below:

$$Z_2 = g^{-r2x} g^{(s2y+r2)x},$$

verifying, by circuitry of the terminal device, whether or not the first verification value and the second verification value coincide with each other by a formula below:

$$Z_1^{s2} = Z_2^{s1}, \text{ and}$$

calculating, by circuitry of the terminal device, the common key K by a formula below:

$$K = Z_1^{s'1} * Z_2^{s'2}.$$

3. The key exchange method according to claim 1, wherein $G_1$, $G_2$, and $G_T$ are assumed to be cyclic groups whose order is a prime number q with κ bit length, $g_1$, $g_2$, and $g_T$ are assumed to be generators of the groups $G_1$, $G_2$, and $G_T$, respectively, e: $G_1 \times G_2 \to G_T$ is assumed to be pairing that satisfies $g_T = e(g_1, g_2)$, H: $\{0, 1\}^* \to \{0, 1\}^\kappa$, $H_1$: $\{0, 1\}^* \to G_1$, and $H_2$: $\{0, 1\}^* \to G_2$ are assumed to be cryptographic hash functions, m is assumed to be a natural number which is greater than or equal to 2, an assumption is made that i=1, m holds, $c_{i,0,0}$, $c_{i,0,1}$, $c_{i,1,1}$, and are assumed to be constants, $p_i \in Z_q[u_0, u_1, v_0, v_1]$ is assumed to be m polynomials which are defined by a formula below:

$$p_i(u_0, u_1, v_0, v_1) = c_{i,0,0} u_0 v_0 + c_{i,0,1} u_0 v_1 + c_{i,1,0} u_1 v_0 + c_{i,1,1} u_1 v_1,$$

$z \in Z_q$ is assumed to be a master secret key, $Z_1 = g_1^z \in G_1$ and $Z_2 = g_2^z \in G_2$ are assumed to be master public keys, $ID_A$ is assumed to be an identifier of the terminal device, $Q_{A,1} = H_1(ID_A) \in G_1$ and $Q_{A,2} = H_2(ID_A) \in G_2$ are assumed to be public keys, $ID_B$ is assumed to be an identifier of the other terminal device, $Q_{B,1} = H_1(ID_B) \in G_1$ and $Q_{B,2} = H_2(ID_B) \in G_2$ are assumed to be public keys, $D_{A,1} = Q_{A,1}^z$ and $D_{A,2} = Q_{A,2}^z$ are assumed to be secret keys of the terminal device, $D_{B,1} = Q_{B,1}^z$ and $D_{B,2} = Q_{B,2}^z$ are assumed to be secret keys of the other terminal device, $z_A \in Z_q$ is assumed to be a short-term secret key of the terminal device, $X_{A,1} = g_1^{xA}$ and $X_{A,2} = g_2^{xA}$ are assumed to be short-term public keys of the terminal device, $z_B \in Z_q$ is assumed to be a short-term secret key of the other terminal device, $X_{B,1} = g_1^{xB}$ and $X_{B,2} = g_2^{xB}$ are assumed to be short-term public keys of the other terminal device, $P_{i,B}$ is assumed to be a value which is defined by a formula below:

$$P_{i,B} = Q_{B,2}^{ci,0,0} X_{B,2}^{ci,0,1},$$

$s_{i1}$ and $s_{i2}$ are assumed to be random numbers which are mutually prime, and $s'_{i1}$ and $S'_{i2}$ are assumed to be random numbers which satisfy a predetermined relationship with the random numbers $s_{i1}$ and $s_{i2}$, generating, by circuitry of the terminal device, the random numbers $s_{i1}$, $s_{i2}$, $s'_{i1}$, and $S'_{i2}$, calculating, by circuitry of the terminal device, the first randomized public keys information for i=1, ..., m by a formula below:

$$(g_2^{-ri1}, g_2^{ri1} P_{i,B}^{si1})$$

and calculating the second randomized public keys information for i=1, ..., m by a formula below:

$$(g_2^{-ri2}, g_2^{ri2} P_{i,B}^{si2}),$$

calculating, by circuitry of the key device, the first commission result $\zeta_{i1}$ for i=1, ..., m by a formula below:

$$\zeta_{i1} = e(D_{A,1}, g_2^{-ri1}) e(D_{A,1}, g_2^{ri1} P_{i,B}^{si1})$$

and calculating the second commission result $\zeta_{i2}$ for i=1, ..., m by a formula below:

$$\zeta_{i2} = e(D_{A,1}, g_2^{-ri2}) e(D_{A,1}, g_2^{ri2} P_{i,B}^{si2}),$$

verifying, by circuitry of the terminal device, whether or not the first verification value and the second verification value coincide with each other for i=1, ..., m by a formula below:

$$\zeta_{i1}^{si2} = \zeta_{i2}^{si1}, \text{ and}$$

generating, by circuitry of the terminal device, the common key by using commission results $\zeta_1, \ldots, \zeta_m$ after calculating a commission result $\zeta_i$ for i=1, ..., m by a formula below:

$$\zeta_i = \zeta_{i1}^{s'i1} = \zeta_{i2}^{s'i2}.$$

4. The key exchange method according to claim 1, wherein

G is assumed to be a cyclic group whose order is a prime number q with κ bit length, g is assumed to be a generator of the group G, H: $\{0, 1\}^* \to \{0,1\}^\kappa$ and $H_1$: $\{0, 1\}^* \to G$ are assumed to be cryptographic hash functions, m is assumed to be a natural number which is greater than or equal to 2, an assumption is made that i=m holds, $c_{i,0,0}$, $c_{i,0,1}$, $c_{i,1,0}$, and $c_{i,1,1}$ are assumed to be constants, $p_i \in Z_q[u_0, u_1, v_0, v_1]$ is assumed to be m polynomials which are defined by a formula below:

$$p_i(u_0, u_1, v_0, v_1) = c_{i,0,0} u_0 v_0 + c_{i,0,1} u_0 v_1 + c_{i,1,0} u_1 v_0 + c_{i,1,1} u_1 v_1,$$

$s_A \in Z_q$ is assumed to be the secret key of the terminal device, $S_A = g^{s_A} \in G$ is assumed to be the public key of the terminal device, $s_B \in Z_q$ is assumed to be a secret key of the other terminal device, $S_B = g^{s_B} \in G$ is assumed to be the public key of the other terminal device, $x_A \in Z_q$ is assumed to be a short-term secret key of the terminal device, $X_A = g^{x_A} \in G$ is assumed to be a short-term public key of the terminal device, $x_B \in Z_q$ is assumed to be a short-term secret key of the other terminal device, $X_B = g^{x_B} \in G$ is assumed to be a short-term public key of the other terminal device, $F_A$ is assumed to be a homomorphism which is $F_A: G \to G$, $h \to h^{x_A}$, $\alpha_{B,i}$ is assumed to be a value which is defined by a formula below:

$$\alpha_{B,i} = X_B^{ci,0,0} S_B^{ci,0,1},$$

$s_{i1}$ and $s_{i2}$ are assumed to be random numbers which are mutually prime, and $s'_{i1}$ and $s'_{i2}$ are assumed to be random numbers which satisfy a predetermined relationship with the random numbers $s_{i1}$ and $s_{i2}$, generating, by circuitry of the terminal device, the random numbers $s_{i1}$, $s_{i2}$, $s'_{i1}$ and $s'_{i2}$, calculating, by circuitry of the terminal device, the first randomized public keys information for i=1, ..., m by a formula below:

$$(g_1^{-1}, g_1 \alpha_{B,i}^{si1})$$

and calculating the second randomized public keys information for i=1, ..., m by a formula below:

$$(g_2^{-1}, g_2 \alpha_{B,i}^{si2}),$$

calculating, by circuitry of the key device, the first commission result $\zeta_{i1}$ for i=1, m by a formula below:

$$\zeta_{i1} = F_A(g_1^{-1}) F_A(g_1 \alpha_{B,i}^{si1})$$

and calculating the second commission result $\zeta_{i2}$ for i=1, ..., m by a formula below:

$$\zeta_{i2} = F_A(g_2^{-1}) F_A(g_2 \alpha_{B,i}^{si2}),$$

verifying, by circuitry of the terminal device, whether or not the first verification value and the second verification value coincide with each other for i=1, ..., m by a formula below:

$$\zeta_{i1}^{si2} = \zeta_{i2}^{si1}, \text{ and}$$

generating, by circuitry of the terminal device, the common key by using commission results $\zeta_1, \ldots, \zeta_m$ after calculating a commission result $\zeta_i$ for i=1, ..., m by a formula below:

$$\zeta_i = \zeta_{i1}^{s'i1} \zeta_{i2}^{s'i2}.$$

5. The key exchange method according to any one of claims 1 to 4, wherein storing, in the storage of the key device, intrinsic information of the terminal device, and calculating, by circuitry of the key device, the first commission result and the second commission result if intrinsic information which is received along with the first randomized public keys information and the second randomized public keys information coincides with the intrinsic information of the terminal device.

6. A key exchange system, wherein $s_1$ and $s_2$ are assumed to be random numbers which are mutually prime and $s'_1$ and $s'_2$ are assumed to be random numbers which satisfy a predetermined relationship with the random numbers $s_1$ and $s_2$, the key exchange system includes a plurality of terminal devices and at least one key device, each of the terminal devices including:
circuitry configured to:
generate the random number $s_1$, $s_2$, $s'_1$, and $s'_2$;
generate first randomized public keys information obtained by randomizing a public key of the terminal device and a public key of another terminal device by using the random number $S_1$ and second randomized public keys information obtained by randomizing the public key of the terminal device and the public key of the other terminal device by using the random number $s_2$;
receive a first commission result and a second commission result from the key device, calculate a first verification value from the first commission result by using the random number $s_2$, calculate a second verification value from the second commission result by using the random number $s_1$, and verify whether or not the first verification value and the second verification value coincide with each other; and
calculate a common key from the first commission result and the second commission result by using the random numbers $s'_1$ and $s'_2$ if the first verification value and the second verification value coincide with each other; and the key device including:
another circuitry configured to:
store a secret key of the terminal device in a storage; and
calculate the first commission result from the first randomized public keys information by using the secret key and calculates the second commission result from the second randomized public keys information by using the secret key.

7. A key device, wherein $s_1$ and $s_2$ are assumed to be random numbers which are mutually prime and $s'_1$ and $s'_2$ are assumed to be random numbers which satisfy a predetermined relationship with the random number $s_1$ and $s_2$, the key device including:
circuitry configured to:
store a secret key of a terminal device in a storage; and
calculate a first commission result from a first randomized public keys information by using the secret key and calculates a second commission result from a second randomized public keys information by using the secret key, the first randomized public keys information is obtained by randomizing a public key of the terminal device and a public key of another terminal device by using the random number $s_1$; and the second randomized public keys information is obtained by randomizing the public key of the terminal device and the public key of the other terminal device by using the random number $s_2$.

8. A terminal device, wherein $s_1$ and $s_2$ are assumed to be random numbers which are mutually prime and $s'_1$ and $s'_2$ are assumed to be random numbers which satisfy a predetermined relationship with the random numbers $s_1$ and $s_2$, the terminal device including:
circuitry configured to:
generate first randomized public keys information obtained by randomizing a public key of the terminal device and a public key of another terminal device by using the random number $s_1$ and second randomized public keys information obtained by randomizing the public key of the terminal device and the public key of the other terminal device by using the random number $s_2$;

receive a first commission result and a second commission result which are calculated by a key device, calculate a first verification value from the first commission result by using the random number $s_2$, calculate a second verification value from the second commission result by using the random number $s_1$, and verify whether or not the first verification value and the second verification value coincide with each other; and calculate a common key from the first commission result and the second commission result by using the random numbers $s'_1$ and $s'_2$ if the first verification value and the second verification value coincide with each other, the first commission result is calculated from the first randomized public keys information by using a secret key of the terminal device; and the second commission result is calculated from the second randomized public keys information by using the secret key of the terminal device.

9. A non-transitory computer readable medium including computer executable instructions that make a key device, wherein $s_1$ and $s_2$ are assumed to be random numbers which are mutually prime and $s'_1$ and $s'_2$ are assumed to be random numbers which satisfy a predetermined relationship with the random number $s_1$ and $s_2$, perform a method including:

storing a secret key of a terminal device in a storage, and calculating a first commission result from a first randomized public keys information by using the secret key and calculate a second commission result from a second randomized public keys information by using the secret key, the first randomized public keys information is obtained by randomizing a public key of the terminal device and a public key of another terminal device by using the random number $s_1$; and the second randomized public keys information is obtained by randomizing the public key of the terminal device and the public key of the other terminal device by using the random number $s_2$.

10. A non-transitory computer readable medium including computer executable instructions that make a terminal device, wherein $s_1$ and $s_2$ are assumed to be random numbers which are mutually prime and $s'_1$ and $s'_2$ are assumed to be random numbers which satisfy a predetermined relationship with the random numbers $s_1$ and $s_2$, perform a method including:

generating first randomized public keys information obtained by randomizing a public key of the terminal device and a public key of another terminal device by using the random number $s_1$ and second randomized public keys information obtained by randomizing the public key of the terminal device and the public key of the other terminal device by using the random number $s_2$;

receiving a first commission result and a second commission result which are calculated by a key device, calculating a first verification value from the first commission result by using the random number $s_2$, calculating a second verification value from the second commission result by using the random number $s_1$, and verifying whether or not the first verification value and the second verification value coincide with each other; and calculating a common key from the first commission result and the second commission result by using the random numbers $s'_1$ and $s'_2$ if the first verification value and the second verification value coincide with each other, the first commission result is calculated from the first randomized public keys information by using a secret key of the terminal device, and the second commission result is calculated from the second randomized public keys information by using the secret key of the terminal device.

* * * * *